US012088027B2

(12) United States Patent
Khaligh et al.

(10) Patent No.: US 12,088,027 B2
(45) Date of Patent: Sep. 10, 2024

(54) LOW-COST CONNECTORS FOR INVERTERS AND CONVERTERS AND METHODS OF MANUFACTURING AND USING THE SAME

(71) Applicants: UNIVERSITY OF MARYLAND, COLLEGE PARK, College Park, MD (US); Fariborz Musavi, Redmond, WA (US)

(72) Inventors: Alireza Khaligh, Arlington, VA (US); Fariborz Musavi, Redmond, WA (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 18/309,337

(22) Filed: Apr. 28, 2023

(65) Prior Publication Data

US 2023/0268678 A1 Aug. 24, 2023

Related U.S. Application Data

(62) Division of application No. 17/087,343, filed on Nov. 2, 2020, now Pat. No. 11,670,881.
(Continued)

(51) Int. Cl.
*H01R 12/70* (2011.01)
*H01R 13/24* (2006.01)
(Continued)

(52) U.S. Cl.
CPC ..... *H01R 12/7082* (2013.01); *H01R 13/2471* (2013.01); *H02S 40/32* (2014.12); *H02S 40/36* (2014.12)

(58) Field of Classification Search
CPC ............ H01R 12/7082; H01R 13/2471; H01R 13/04; H01R 13/10; H01R 13/6273;
(Continued)

(56) References Cited

U.S. PATENT DOCUMENTS 6,213,815 B1 4/2001 Wu
6,220,872 B1* 4/2001 Chen .................... H01R 31/065
439/79
(Continued)

FOREIGN PATENT DOCUMENTS

WO 2010136189 A1 12/2010

OTHER PUBLICATIONS

Apsystems Altenergy Power, YC600 Microinverter, Product Datasheet, 11.20 Copyright, 2 pages.
(Continued)

*Primary Examiner* — Briggitte R. Hammond
(74) *Attorney, Agent, or Firm* — Quarles & Brady LLP

(57) ABSTRACT

In some embodiments, systems and methods for connector assembly for use with an AC or DC power interface of a power conversion device, such as a converter and an inverter, are provided. The connector assembly can include a circuit board, a power connector, and a pin. The power connector can have a base configured to be secured relative to the circuit board and define a first channel extending through the power connector along a first channel axis. The first pin can have a first pin body that extends along a first pin axis and a first connection element that extends along the first pin axis from the first pin body to a first terminal end that is skewed relative to the first pin axis.

20 Claims, 29 Drawing Sheets

Related U.S. Application Data

(60) Provisional application No. 62/929,553, filed on Nov. 1, 2019.

(51) Int. Cl.
*H02S 40/32* (2014.01)
*H02S 40/36* (2014.01)

(58) Field of Classification Search
CPC .. H01R 13/74; H01R 12/724; H01R 12/7088; H02S 40/32; H02S 40/36; Y02E 10/50
See application file for complete search history.

(56) References Cited

U.S. PATENT DOCUMENTS

| | | | |
|---|---|---|---|
| 7,503,794 B2 | 3/2009 | Haller | |
| 8,535,081 B2 | 9/2013 | Chikano | |
| 9,806,443 B1 | 10/2017 | Thackston | |
| 10,811,805 B2 * | 10/2020 | Yamanaka | H05K 5/0069 |
| 2013/0058044 A1 | 3/2013 | Watanabe | |
| 2014/0140119 A1 * | 5/2014 | Shinohara | H05K 7/1432 363/141 |
| 2015/0369401 A1 | 12/2015 | Sizelove | |

OTHER PUBLICATIONS

Budach, YouTube: wvc1200 Micro inverter review and history. Good or bad inverter? 2 year history, https://www.youtube.com/watch?v=AJE49QckhHA&ab_channel=CaryBudach, Jul. 20, 2018.

Dongguan Maywah Electronics Co. Ltd, MaySun-1200W-B, MaySun-600W-B User Manual, 14 pages.

Jae Japan Aviation Electronics Industry, Ltd., MX23A Series (Waterproof Board-to-Cable 040 Contact Connectors), https://www.jae.com/en/connectors/series/detail/id=64301&application_code=A1050, 3 pages.

Nimbalkar, YouTube: WVC1200 Solar Micro Grid Tie Power Inverter Teardown & Repair, https://www.youtube.com/watch?v=7V0OxaaXbA4&ab_channel=KedarNimbalkar, Jun. 1, 2016.

* cited by examiner

US 12,088,027 B2

LOW-COST CONNECTORS FOR INVERTERS AND CONVERTERS AND METHODS OF MANUFACTURING AND USING THE SAME

CROSS-REFERENCE TO RELATED APPLICATIONS

This application is a divisional of U.S. application Ser. No. 17/087,343, filed Nov. 2, 2020, which claims priority to U.S. Provisional Application No. 62/929,553, filed Nov. 1, 2019, which are hereby incorporated by reference in their entireties for all purposes.

STATEMENT REGARDING FEDERALLY SPONSORED RESEARCH

This invention was made with government support under DEEE0008350 awarded by the U.S. Department of Energy. The government has certain rights in this invention.

BACKGROUND

Photovoltaic modules can generate direct current (DC) power based on received solar energy. Photovoltaic modules can include multiple photovoltaic cells that can be electrically coupled to one another to allow the multiple photovoltaic cells to contribute to a combined output power for the photovoltaic module. In some applications, the DC power generated by a photovoltaic module can be converted to alternating current (AC) power through the use of a power inverter, such as a photovoltaic (PV) microinverter. The power inverter can be electrically coupled to an output of the photovoltaic module. Often the power inverter is connected to adapters and intervening wiring.

SUMMARY

In accordance with some embodiments of the disclosed subject matter, systems and methods for establishing electrical connections with power conversion devices (e.g., inverters and converters) are provided.

In accordance with some embodiments of the disclosed subject matter, a connector assembly configured for use with at least one of an AC and a DC power interface of a power conversion device, such as an electronic converter or inverter (e.g., microinverter), is provided. The connector assembly can include a circuit board, a power connector, and a first pin. The circuit board can define a first surface and a second surface spaced apart from the first surface by a thickness. The power connector can have a base configured to be secured relative to the circuit board and define a first channel that extends through the power connector along a first channel axis. The first pin can have a first pin body that extends along a first pin axis and a first connection element that extends along the first pin axis from the first pin body to a first terminal end that is skewed relative to the first pin axis. The first pin can be at least partially seated in the first channel. The terminal end can be configured to electrically engage the circuit board.

Some embodiments include a method for producing a power conversion device, such as an electronic converter or inverter. The method can include providing a printed circuit board that is configured to receive electrical components. The method can include inserting a pin having a connection element into a channel of a power connector. The method can include securing the power connector to the printed circuit board via a securing portion of the power connector. The method can include electrically coupling the connection element to the printed circuit board. The method can include inserting the printed circuit board into an interior volume of a housing that includes a cutout so that the power connector extends through the cutout.

In some embodiments, a power conversion device, such as an electronic converter or an electronic inverter (e.g., a microinverter), is provided. The power conversion device can include a housing, a circuit board, a DC power connector, and an AC power connector. The housing can define an interior volume that includes an exterior surface. The circuit board can be secured within the interior volume. The DC power connector can include a DC power connector body and a DC power pin. The DC power connector body can be engaged with the housing and the DC power pin can extend through the exterior surface of the housing and into the interior volume whereat the DC power pin is coupled to the circuit board. The AC power connector can include an AC power connector body and an AC power pin. The AC power connector body can be engaged with the housing and the AC power pin can be coupled to the circuit board.

BRIEF DESCRIPTIONS OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
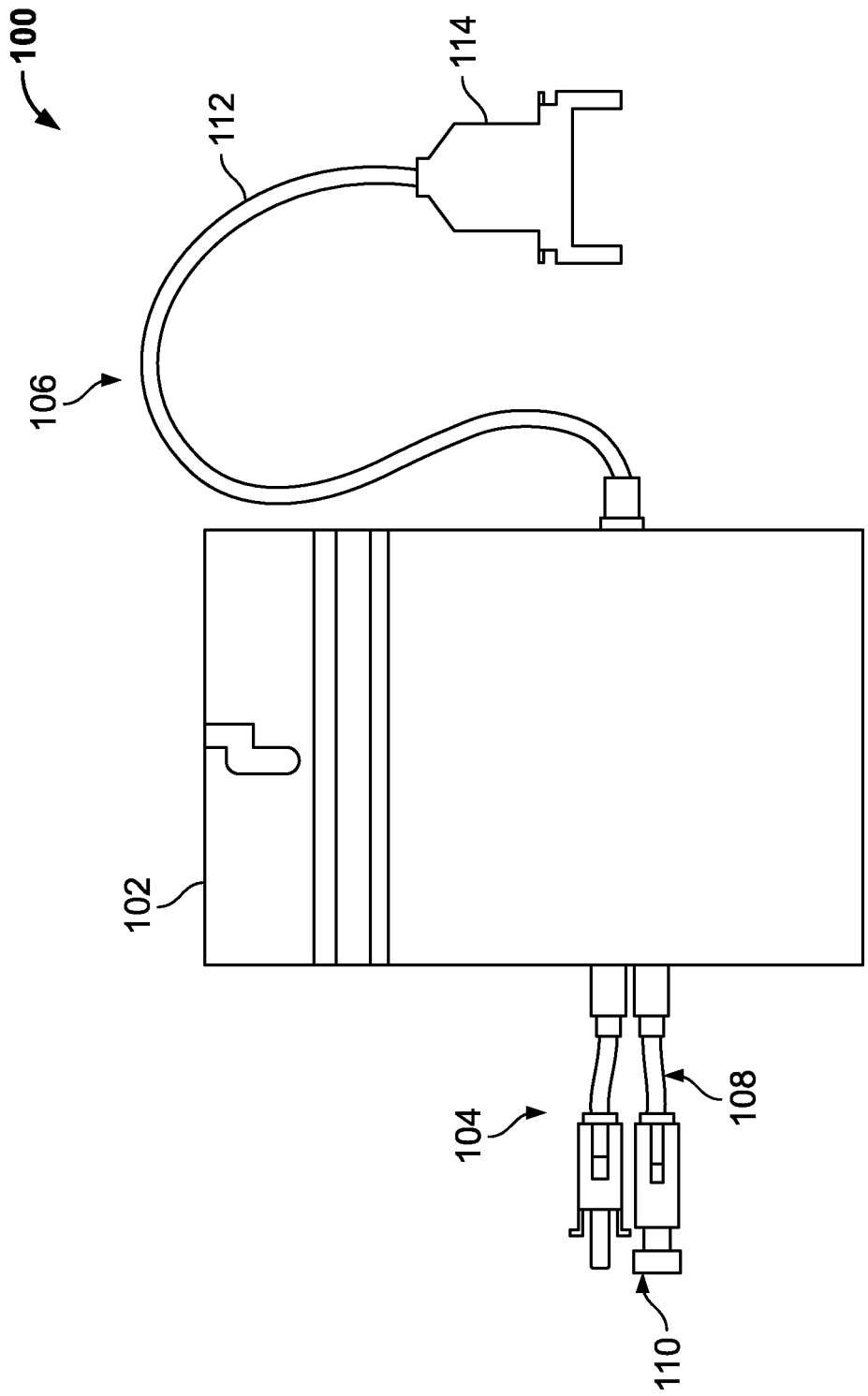
FIG. 1 is a top view of a conventional microinverter.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled," and variations thereof, are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular embodiment and perspective described. For example, reference to features or directions as "horizontal," "vertical," "front," "rear," "left," "right," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features.

The following discussion is presented to enable a person skilled in the art to make and use embodiments of the invention. Given the benefit of this disclosure, various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, inverters, such as microinverters, can be used in photovoltaics. A microinverter can convert direct current (DC) generated by a solar module to alternating current (AC). In general, a single microinverter can be in electrical contact with a single solar module and can have several advantages over conventional inverters. For example, a microinverter can electrically isolate solar modules within an array of modules from one another so that if there is an issue, or even complete failure of a solar module, the output of the array is not disproportionately affected.

In general, AC and DC connectors are among major components in the development and manufacturing of various power conversion devices, such as converters and inverters. These connectors can increase the cost of manufacturing, assembling, and packaging for power conversion systems. For example, AC and DC connectors often contribute a significant portion of the bill-of-materials for the entire converter/inverter. As briefly described above, in the case of a photovoltaic (PV) microinverter, standard systems incorporate two connectors to operate: a DC connector to connect the PV module to the inverter, and an AC connector to connect the inverter to a power grid. Such hardware components can increase the cost of the system. Additionally, AC and DC components can adversely increase the size and weight of individual microinverters. Since a plurality of microinverters may be used in an array of solar modules, it may be useful to reduce the size, weight, and cost of each microinverter, and to enhance the manufacturability of each microinverter by, for example, reducing the cost and the potential failure modes.

Generally, some embodiments of the invention can include a device for establishing electrical connections with power conversion devices, such as inverters and converters. In some embodiments, a connector according to some embodiments of the invention may eliminate the need for standard, and often costly, cumbersome interface connections between AC bus-cables and AC output connectors of inverter/converter structures, such as a microinverter, for example. Additionally, some embodiments of the invention provide methods of manufacturing and using such connectors. While the example embodiments are generally described in the context of a microinverter, one skilled in the art (given the benefit of this disclosure) will appreciate that the scope is not limited to the example microinverter, but is generally applicable to power conversion devices and other contexts that can benefit from the concepts taught herein.

FIG. 1 illustrates an example of a conventional microinverter 100. The microinverter 100 includes a housing 102, a DC power connector assembly 104, and an AC power connector assembly 106. The DC power connector assembly 104 can be configured as an adapter and can include DC power cables 108 and a DC power connector 110. Internally within the housing 102, though not shown, conventional microinverters often include additional wiring to electrically couple DC power cables, such as the DC power cables 108 illustrated in FIG. 1, to a printed circuit board. As a result, during a manufacturing process of the conventional microinverter 100, the DC power connect assembly 104 may be electrically coupled to the microinverter 100 after the housing 102 is assembled and the DC power cables fed through openings (not shown) in the housing 102.

Similar to the DC power connector assembly 104, the AC power connector assembly 106 can be configured as an adapter and include an AC power cable 112 and an AC power connector 114. In some conventional microinverters, such as the microinverter of FIG. 1, additional wiring may also be used inside the housing 102 to electrically couple the AC power cable 112 to a printed circuit board. Like the DC power connector assembly 104, during the manufacturing process of the conventional microinverter 100, the AC power connector assembly 106 is often electrically coupled to the microinverter 100 after the housing 102 is assembled. Adhesive sealants are sometimes used in an attempt to establish an environmental barrier where the cables pass into the housing 102, with limited reliability and effectiveness.

Figure 2:
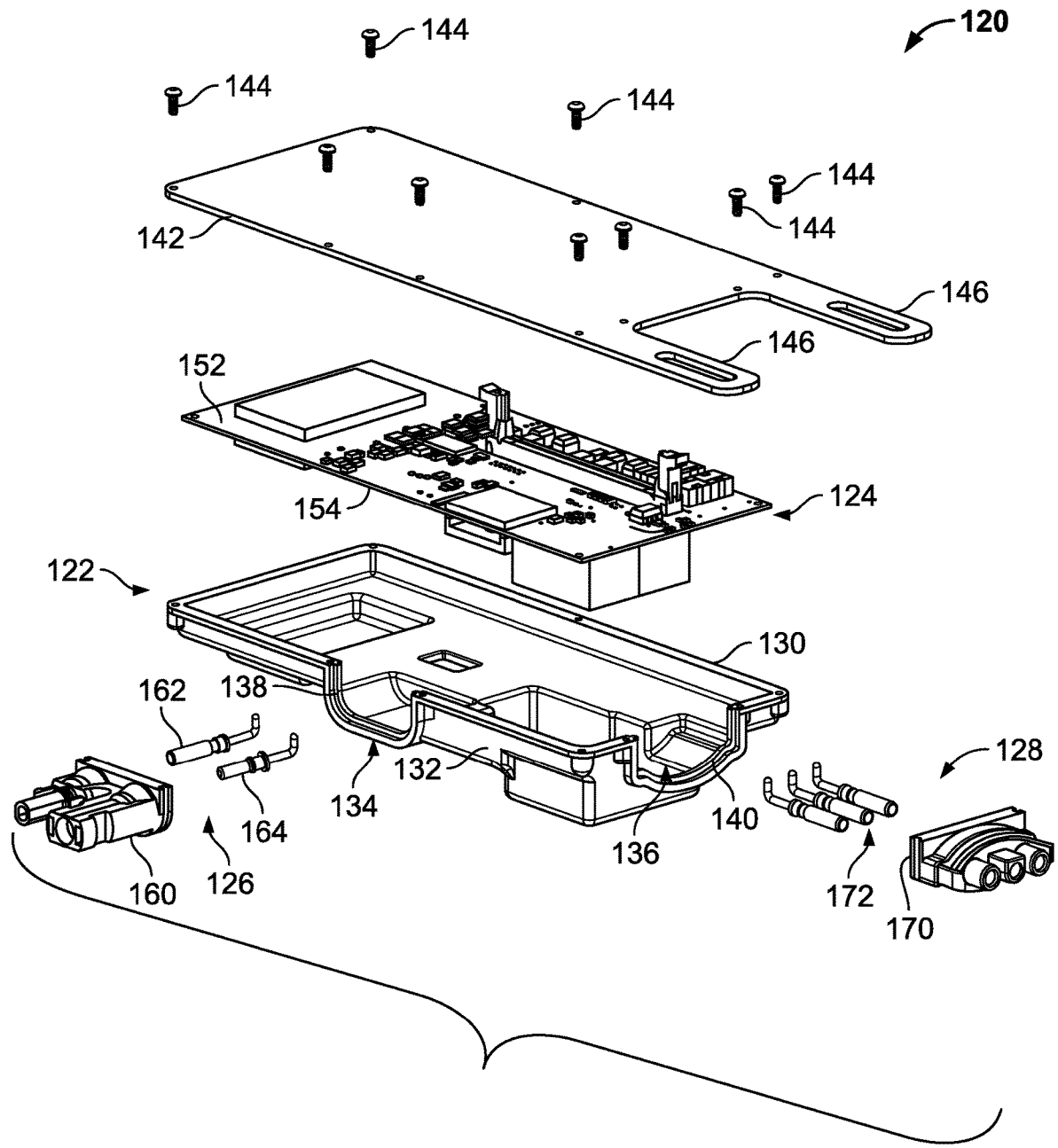
FIG. 2 is an exploded isometric view of a microinverter according to an embodiment of the invention.

FIG. 2 illustrates one example of an electronic inverter, configured as a microinverter 120, according to one embodiment of the invention. The microinverter 120 includes a housing 122, a circuit board 124, a DC power connector 126, and an AC power connector 128. In the illustrated embodiment, the housing 122 includes a body 130 that defines an interior volume and includes an exterior surface 132. The body 130 further includes a first notch 134 and a second notch 136 formed therein. The first notch 134 includes a first protrusion 138 that extends along a surface of the first notch 134. Similarly, the second notch 136 includes a second protrusion 140 that extends along a surface of the second notch 136. In the illustrated embodiment, each of the first and second notches 134, 136 are formed in a boss that extends from the exterior surface 132 generally about the perimeter of the first and second notches 134, 136.

The housing 122 also includes a lid 142 that is dimensioned to engage and be secured to the body 130 via fasteners 144. In the illustrated embodiment, the fasteners 144 are configured as screws. However, other configurations are possible. For example, other fasteners such as pins, bolts, nuts, adhesives, etc. can be used to secure the lid 142 to the body 130. The lid 142 includes a pair of mount arms 146 that extend therefrom. In the illustrated embodiment, the pair of mount arms 146 are generally coplanar with the lid 142. In other embodiments, the housing 122 can include additional or alternative mounting features, such as mounting brackets that extend from the body 130.

Still referring to FIG. 2, the circuit board 124, which can be configured as a printed circuit board (PCB), includes a top surface 152 and a bottom surface 154. The top surface 152 and the bottom surface 154 define a thickness of the circuit board 124, which is an orthogonal length between the top surface 152 and the bottom surface 154. In general, the circuit board 124 is configured to electrically couple a variety of electrical components of the microinverter 120. For example, the circuit board 124 can include conductive tracks, pads, and other features etched from one or more sheet layers of copper laminated onto and/or in between a non-conductive substrate.

Also shown in FIG. 2, the DC power connector 126 includes a DC power connector body 160 and first and second pins 162, 164. The DC power connector 126 can be coupled to a corresponding DC power output. For example, the DC power connector 126 may be configured to be implemented with a PV panel. In particular, the DC power connector 126 may be configured to be compatible with industry standard connectors, such as an MC-4 connector type, for example. The AC power connector 128 includes an AC power connector body 170 and connector pins 172. The AC power connector 128 may be configured to electrically engage to a corresponding AC power interface (see, for example, FIGS. 13 and 14), which can be used to connect the microinverter 120 to a power grid. In one embodiment, the first and second pins 162, 164 (and the pins described throughout) may be produced from folded and press-formed copper sheet, or of any other suitable material/process to meet application-specific requirements.

Figure 3:
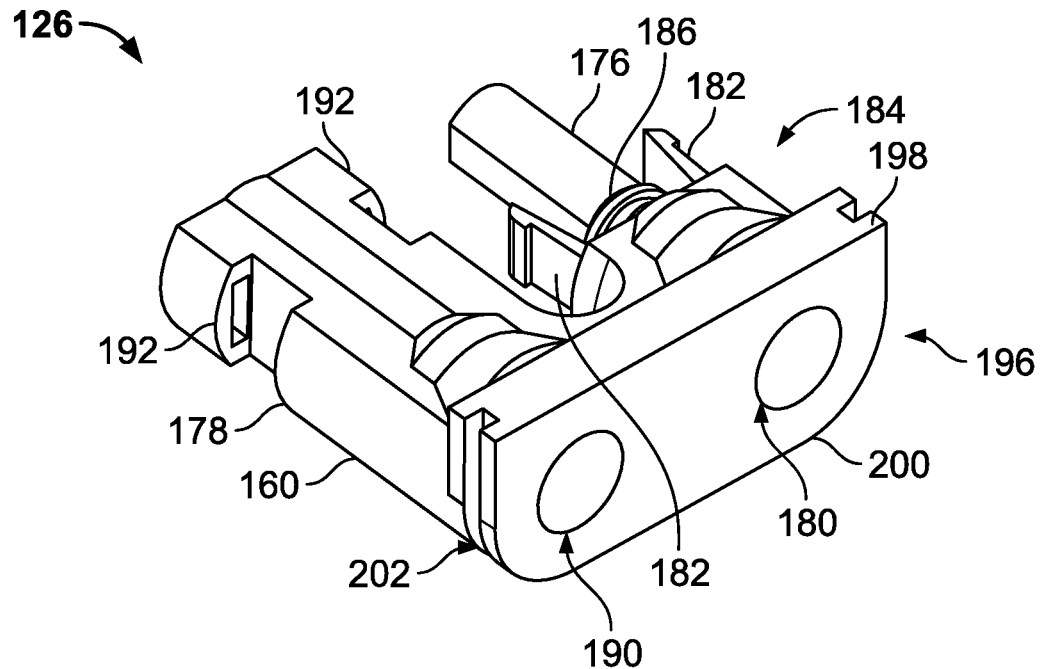
FIG. 3 is a back isometric view of a DC power connector of the microinverter of FIG. 2.
Figure 4:
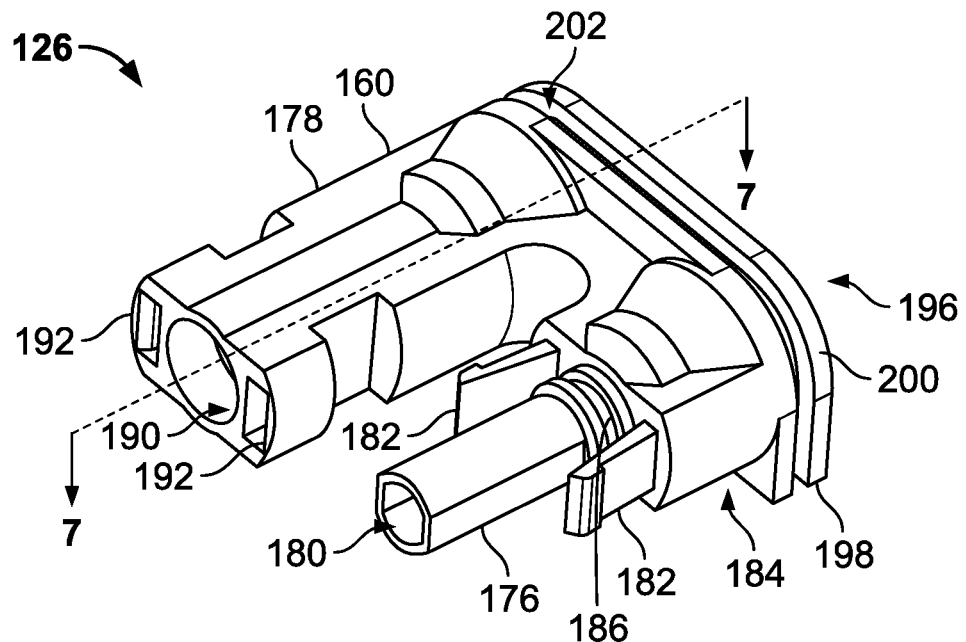
FIG. 4 is a front isometric view of the DC power connector of FIG. 2.

FIGS. 3 and 4 illustrate the DC power connector 126 of FIG. 2. The DC power connector body 160 includes a first plug 176 and a second plug 178. The first plug 176 includes a first channel 180 that defines a first channel axis. The first plug 176 further includes a pair of arms 182 that can be resilient and configured as female connector locking tabs that extend from a base 184 of the first plug 176. The first plug 176 also includes a seal 186, which may be configured as an O-ring, proximate to the base 184. The second plug 178 includes a second channel 190 that defines a second channel axis. The second plug 178 further includes a pair of connector receptacles 192 configured as male connector tab receptacles.

Still referring to FIGS. 3 and 4, the DC power connector 126 includes a connector base 196 having a flat surface 198 and a curved surface 200 that extends around the base 196 and connects to the flat surface 198. The curved surface 200 includes a profile that is similarly shaped to the first notch 134 in the housing 122, and defines a groove 202. The groove 202 is dimensioned to receive the first protrusion 138 of the first notch 134 formed in the body 130 of the housing 122. The engagement of the first protrusion 138 with the groove 202 will be described below with reference to FIG. 8. In other embodiments, a DC power connector, similar to the DC power connector 126, can include a mating feature similar to the groove 202 that can be dimensioned to engage a corresponding mating feature formed in a lid of a housing, similar to the lid 142, to establish a sealing interface completely about the base 196.

Figure 5:
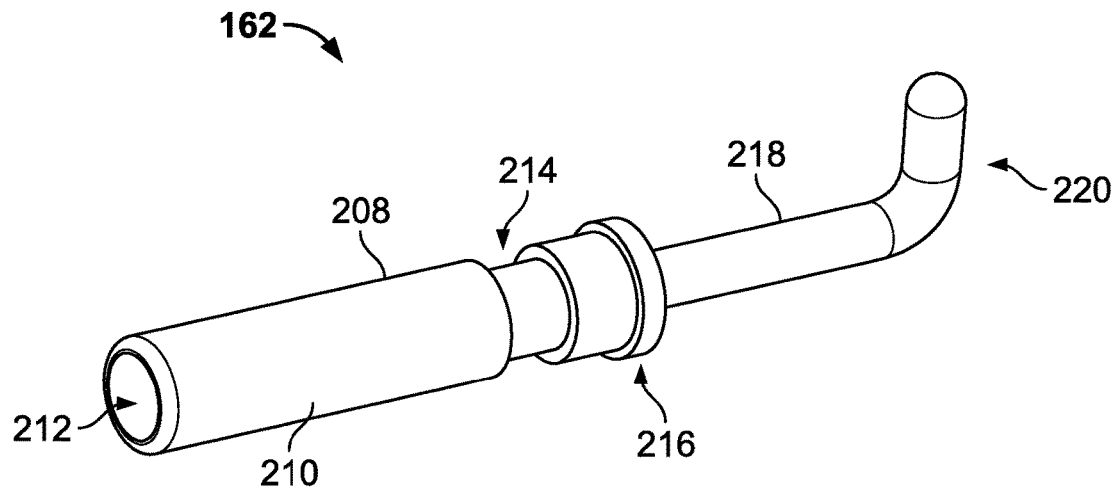
FIG. 5 is an isometric view of a first pin of the DC power connector of FIG. 2.
Figure 6:
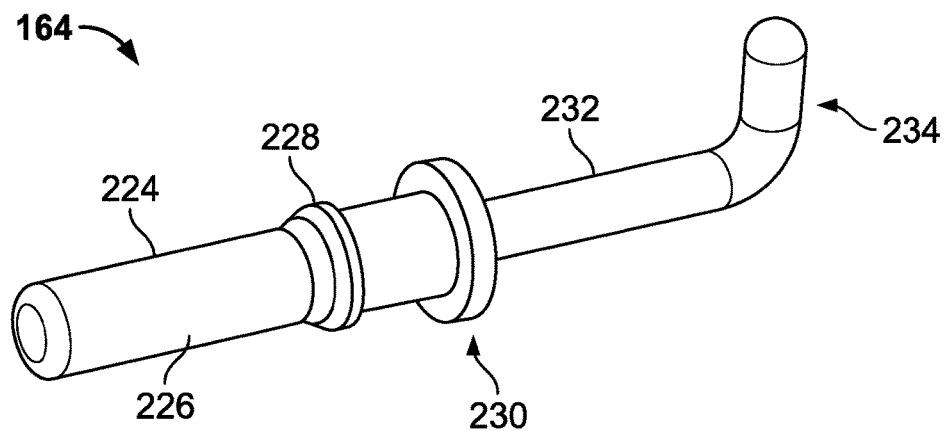
FIG. 6 is an isometric view of a second pin of the DC power connector of FIG. 2.

FIGS. 5 and 6 illustrate the first and second pins 162, 164 of the DC power connector 126, respectively. With reference to FIG. 5, the first pin 162 includes a pin body 208 that defines a first pin axis. The pin body 208 includes an outer surface 210 and an inner channel 212. The outer surface 210 includes an annular recessed portion 214 and an annular protruded portion 216. The pin body 208 is generally configured as a female pin dimensioned to receive a corresponding male pin within the inner channel 212. The first pin 162 also includes a first connection element 218 extending from the pin body 208 along the first pin axis.

The first connection element 218 includes a terminal end 220. In the illustrated embodiment, the terminal end 220 is skewed relative to the first connection element 218 and relative to the first pin axis. In particular, in the illustrated embodiment, the terminal end 220 is bent approximately 90 degrees relative to the first pin axis. However, in other embodiments, the terminal end 220 can be skewed at any angle relative to the first pin axis. Additionally, in some embodiments, the terminal end 220 can be substantially collinear with the first connection element 218. In other embodiments, the skew in the first connection element 218 may occur closer to or further from, for instance, the terminal end 220.

With reference to FIG. 6, the second pin 164 includes a pin body 224 that defines a second pin axis. The pin body 224 includes an outer surface 226 having a ramped annular protrusion 228 and an annular protruded portion 230. The pin body 224 is generally configured as a male pin dimensioned to be received in a corresponding female pin within an inner channel. The second pin 164 also includes a second connection element 232 extending from the pin body 222 along the second pin axis.

The second connection element 232 includes a terminal end 234 that is substantially similar to the terminal end 220 of the first pin 162, and therefore will not be described in detail. In general, the gauges of the first and second connection elements 218, 232 illustrated in FIGS. 5 and 6, respectively, are by way of example. A variety of gauges and cross-sections are possible and can be adjusted, varied, or selected based on the use and capabilities of the microinverter 120, current and/or voltage ratings, circuit board characteristics such as proximity of electrical components or pre-formed recesses, etc. Therefore, the gauges of the first and second connection elements 218, 232 can be greater or less than the illustrated embodiment, and the form factors can be adapted to address application-specific requirements.

Generally, one of the first pin 162 and the second pin 164 can correspond to a positive DC power terminal. Likewise, the other of the first pin 162 and the second pin 164 can correspond to a negative DC power terminal.

Figure 7:
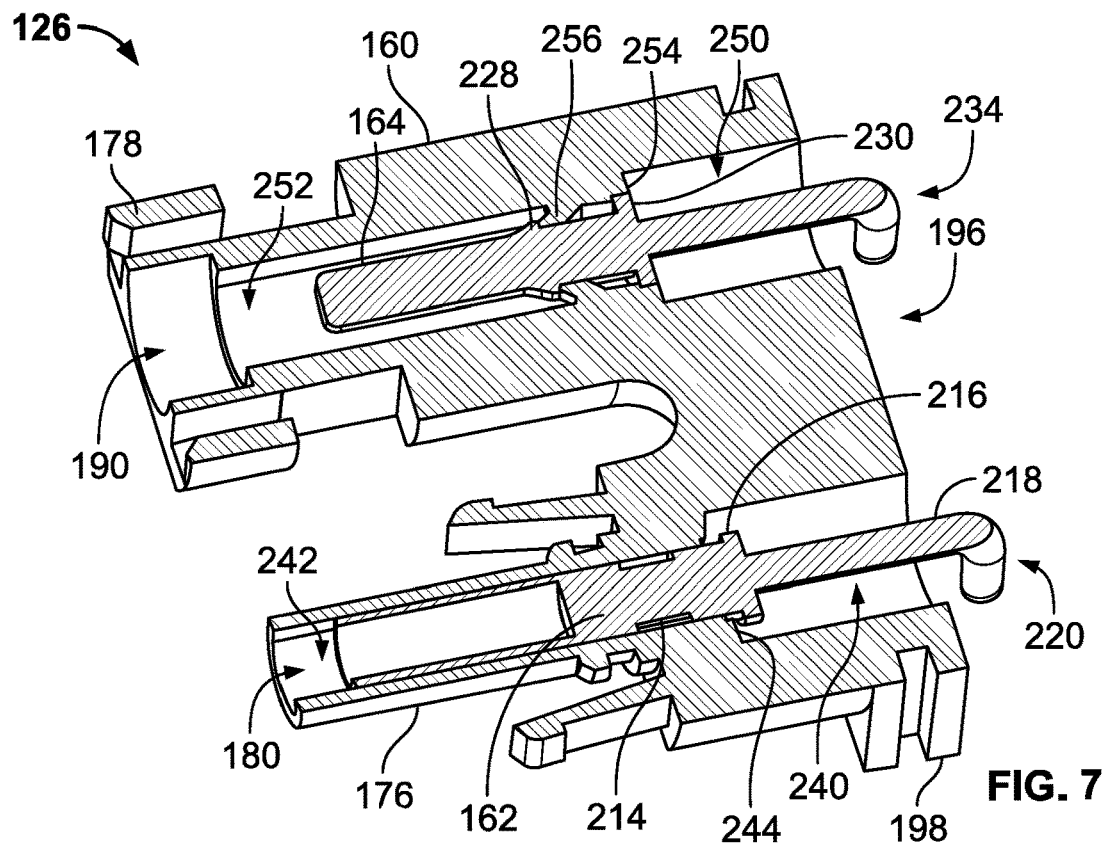
FIG. 7 is a cross-sectional isometric view of the DC power connector taken along line 7-7 of FIG. 4.

FIG. 7 illustrates a cross-sectional view of the DC power connector 126 according to some embodiments of the invention. As shown, the first pin 162 can be inserted into the first channel 180 of the first plug 176 so that the first channel axis is collinear with the first pin axis of the first pin 162. In the illustrated embodiment, the first channel 180 includes a first portion 240 and a second portion 242 separated by a step 244. As shown, the first portion 240 is generally wider in cross section than the second portion 242.

When the first pin 162 is inserted into the first channel 180 and secured to the DC power connector body 160, the annular protruded portion 216 abuts the step 244 and the annular recessed portion 214 is seated within the second portion 242 of the first channel 180. The second portion 242 may include an annular or partial inward protrusion configured to interface with the recessed portion 214 of the first pin 162 to releasably couple the first pin 162 in the first channel 180. The first connection element 218 extends through the first portion 240 of the first channel 180 and outside of the first channel 180 proximate to the connector base 196. The terminal end 220 is positioned outside the first channel 180 and generally extends toward the flat surface 198 of the DC power connector body 160. The direction that the terminal end 220 extends may be dictated by the connection orientation of the DC power connector body 160 relative to the circuit board 124. Therefore, in other embodiments, the terminal end 220 may extend in different directions than shown in FIG. 7, as will be described in detail below.

Still referring to FIG. 7, the second pin 164 can be inserted into the second channel 190 of the second plug 178 so that the second channel axis is collinear with the second pin axis of the second pin 164. Similar to the first channel 180, the second channel 190 includes a first portion 250 and a second portion 252 separated by a step 254. As shown, the first portion 250 is generally wider in cross section than the second portion 252.

When the second pin 164 is inserted into the second channel 190 and secured to the DC power connector body 160, the annular protruded portion 230 abuts the step 254 and the ramped annular protrusion 228 engages a lock member 256 formed in the second portion 252. The ramped annular protrusion 228 can move past the lock member 256 in a first direction as the second pin 164 is inserted into the second channel 190, and is inhibited from being unintentionally moved in a second direction out of the second channel 190. Similar to the first connection element 218 and terminal end 220, the second connection element 232 extends through the first portion 250 of the second channel 190 and the terminal end 234 extends toward the flat surface 198 of the DC power connector body 160.

Each of the first and second pins 162, 164 include elements formed on their respective pin bodies 208, 224 that engage the DC power connector body 160 to axially orient the first and second pins 162, 164 within the respective first and second channels 180, 190. In some embodiments, each of the first and second pins 162, 164 can include elements formed on their respective pin bodies 208, 224, such as alignment features, for example, that rotationally orient the pins 162, 164 within the respective channels 180, 190. In particular, an alignment feature (see, for example, FIG. 25) can rotationally orient each terminal end 220, 234 with respect to the DC power connector body 160 to facilitate electrically coupling the DC power connector 126 to the circuit board 124 during a manufacturing process.

Figure 8:
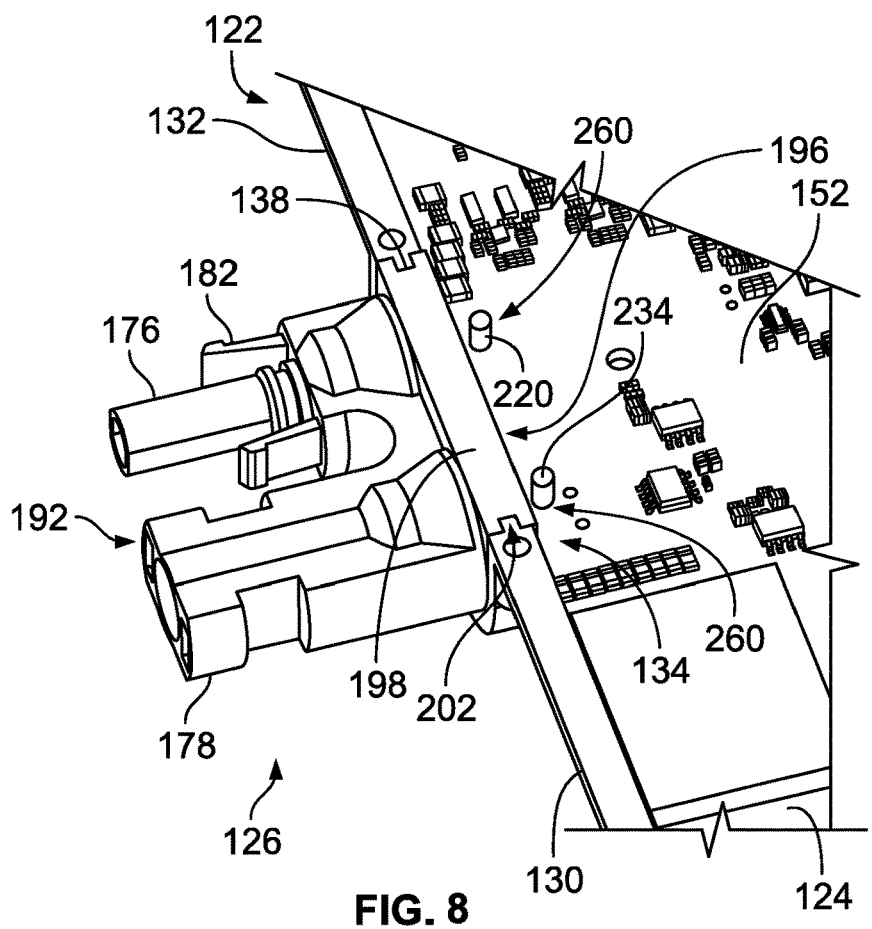
FIG. 8 is an isometric partial view of the DC power connector engaged with a circuit board of the microinverter of FIG. 2.

FIG. 8 illustrates the DC power connector 126 electrically coupled to the circuit board 124 and secured to the housing 122 at the first notch 134 formed in the body 130. In an installed configuration, the circuit board 124 can be secured within the housing 122 so that the bottom surface 154 of the circuit board 124 faces the body 130 of the housing 122. The DC power connector 126 can be secured within the first notch 134 so that the first protrusion 138 is seated within the groove 202 of the connector base 196 (e.g., forming a tongue and groove-type fit).

When the DC power connector 126 is secured to the housing 122, the interface between the curved surface 200 of the connector base 196 and the first notch 134 can include one or more of a seal, sealant, or adhesive. The one or more of the seal, sealant, or adhesive can facilitate securing the DC power connector 126 to the housing 122 and provide a barrier between the exterior surface 132 of the body 130 and the interior volume. Similarly, when the DC power connector 126 is secured to the housing 122, the flat surface 198 can engage the lid 142. The interface between the flat surface 198 and the lid 142 can also include one or more of a seal, sealant, or adhesive to facilitate securing the DC power connector 126 to the housing 122 and provide a barrier between the exterior surface 132 and the interior volume of the housing 122.

Portions of the first and second connection elements 218, 232 extend beyond their respective first and second channels 180, 190 of the DC power connector body 160 (see, for example, FIG. 7). In an installed configuration, the portions of the first and second connection elements 218, 232 that extend beyond the DC power connector body 160 extend under the circuit board 124 proximate to the bottom surface 154. The circuit board 124 includes recesses 260 that extend through the thickness of the circuit board 124. The terminal ends 220, 234 of the first and second pins 162, 164, respectively, can each extend through a recess 260. During a manufacturing process, the terminal ends 220, 234 can be soldered, crimped, or otherwise deformed at the top surface 152 of the circuit board 124 to provide electrical coupling between the components of the circuit board 124 and the DC power connector 126. In some embodiments, the terminal ends 220, 234 can be electrically coupled to the circuit board 124 before the circuit board 124 is inserted into the housing 122, such that the DC power connector 126 and the circuit board 124 can be installed into the housing 122 as an assembly.

In general, the first and second connection elements 218, 232 and their respective terminal ends 220, 234 provide a rigid connection between the DC power connector 126 and the circuit board 124. In some cases, the rigid connection can restrict motion of the first and second pins 162, 164 relative to the circuit board 124, which can reduce fatigue failure between the terminal ends 220, 234 and the circuit board 124. Additionally, direct connection of the first and second pins 162, 164 from the DC power connector 126 and the circuit board 124 can facilitate compact housing compared to some conventional microinverters that employ cables or wires to electrically couple components of a circuit board to a DC power connector. In some cases, eliminating unnecessary wired connections between components within a microinverter can save time and costs (e.g., material and labor costs) during manufacturing processes (e.g., an automated manufacturing process), and reduce potential failure modes while improving reliability.

In the embodiment illustrated in FIG. 8, the terminal ends 220, 234 extend through the recesses 260 of the circuit board 124 from the bottom surface 154 to the top surface 152. However, in other embodiments, it should be appreciated that various components, such as the DC power connector body 160 or the first and second pins 162, 164, could be rotated 180 degrees so that the terminal ends 220, 234 extend through the recesses 260 of the circuit board 124 from the top surface 152 to the bottom surface 154. In still other embodiments, portions of the connection elements 218, 232 may extend across a single side of the circuit board 124 and can be electrically coupled to the circuit board 124 on that same side.

Figure 9:
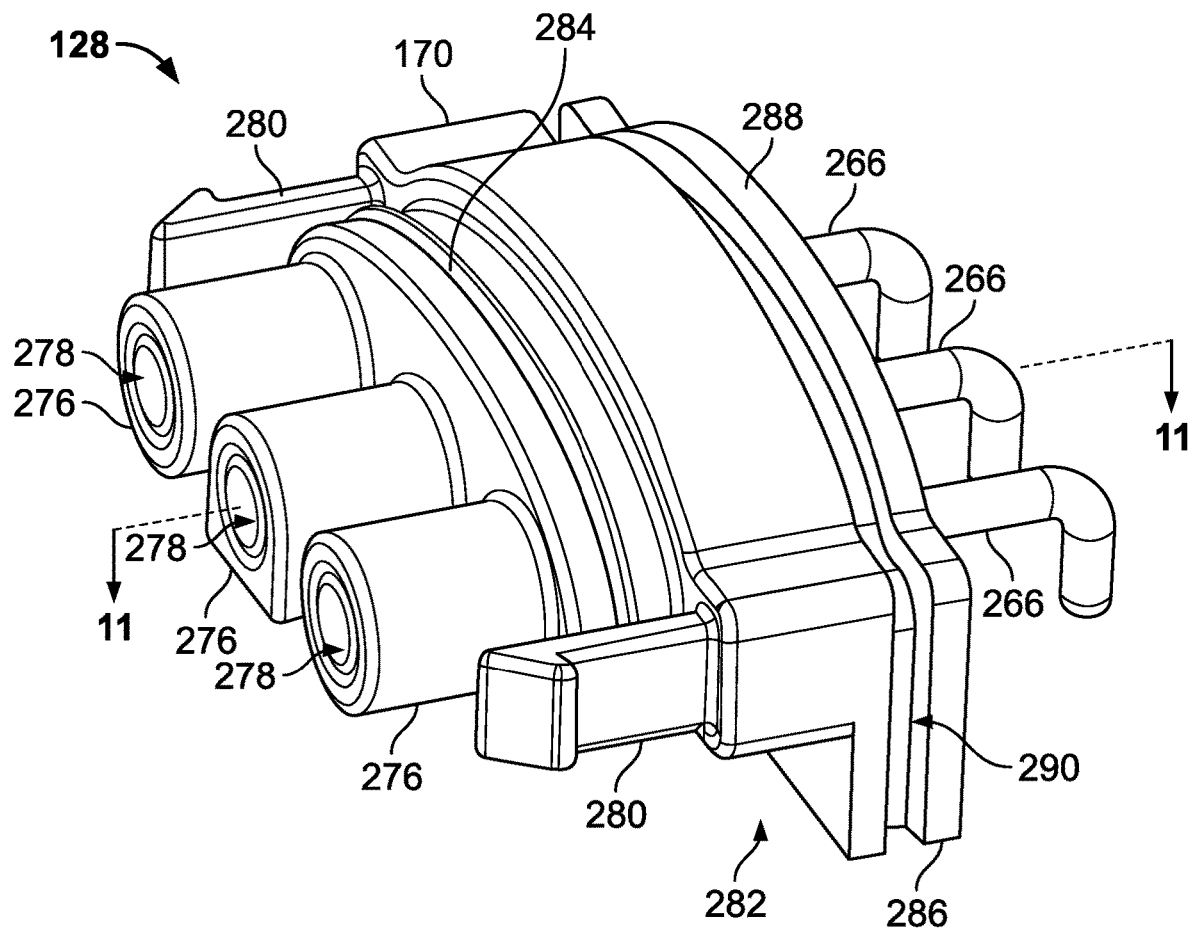
FIG. 9 is an isometric view of an AC power connector of the microinverter of FIG. 2.

FIG. 9 illustrates the AC power connector 128 of the microinverter 120 of FIG. 2. The AC power connector body 170 includes three plug members 276. As illustrated, the center plug member 276 includes an irregular outer surface geometry to facilitate appropriate connection orientation between the AC power connector 128 and an AC power interface connector. Generally, the three plug members 276 and their corresponding connector pins 172 correspond to common AC terminals (e.g., line, neutral, and earth). Each of the plug members 276 includes a channel 278 that defines a channel axis. The AC power connector body 170 also includes a pair of arms 280 that can be resilient and configured as female connector locking tabs that extend from a base 282 of the AC power connector body 170. The AC power connector 128 also includes a seal 284 proximate to the base 282.

The base 282 includes a flat surface 286 and a curved surface 288 that extends around the base 282, similar to the flat surface 198 and the curved surface 200 of the DC power connector 126. The curved surface 288 includes a profile that is similarly shaped to the second notch 136 in the housing 122 and defines a groove 290. In general, the groove 290 is dimension to receive the second protrusion 140 of the second notch 136. The engagement of the second protrusion 140 with the groove 290 will be described below with reference to FIG. 12. In other embodiments, an AC power connector, similar to the AC power connector 128, can include a mating feature similar to the groove 290 that can be dimensioned to engage a corresponding mating feature formed on a lid of a housing, similar to the lid 142.

Figure 10:
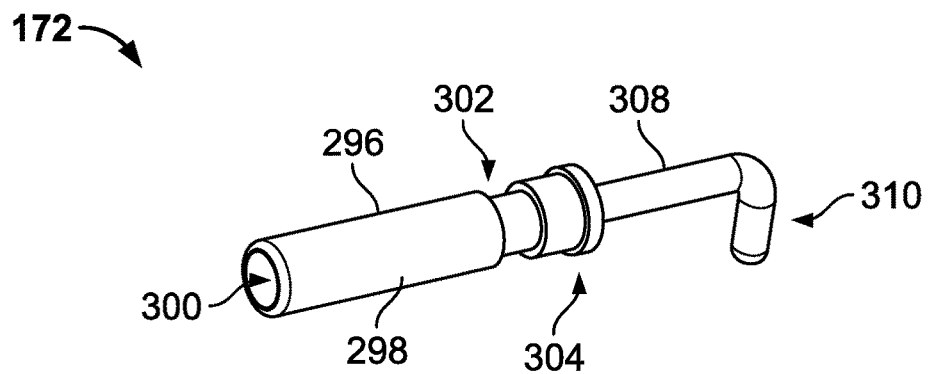
FIG. 10 is an isometric view of a connector pin of the AC power connector of FIG. 9.

FIG. 10 illustrates one of the connector pins 172 of the AC power connector 128. Each of the connector pins 172 can be substantially similar, therefore the description of a single connector pin 172 below can apply to each of the connector pins 172. The connector pin 172 includes a pin body 296 that defines a connector pin axis. The pin body 296 includes an outer surface 298 and an inner channel 300. The outer surface 298 includes an annular recessed portion 302 and an annular protruded portion 304. The pin body 296 is generally configured as a female pin dimensioned to receive a corresponding male pin within the inner channel 300. The connector pin 172 also includes a connection element 308 extending from the pin body 296 along the first pin axis, similar to the first and second connection elements 218, 232 of the DC power connector 126.

Similar to the first and second connection elements 218, 232, the connection element 308 includes a terminal end 310. In the illustrated embodiment, the terminal end 310 is skewed relative to the connection element 308 and relative to the connector pin axis. However, in other embodiments, the terminal end 310 can be skewed at any angle relative to the connector pin axis. Additionally, in some embodiments, the terminal end 310 can be substantially collinear with the connection element 308. In other embodiments, the skew in the connection element 308 may occur closer to or further from, for instance, the terminal end 310.

Figure 11:
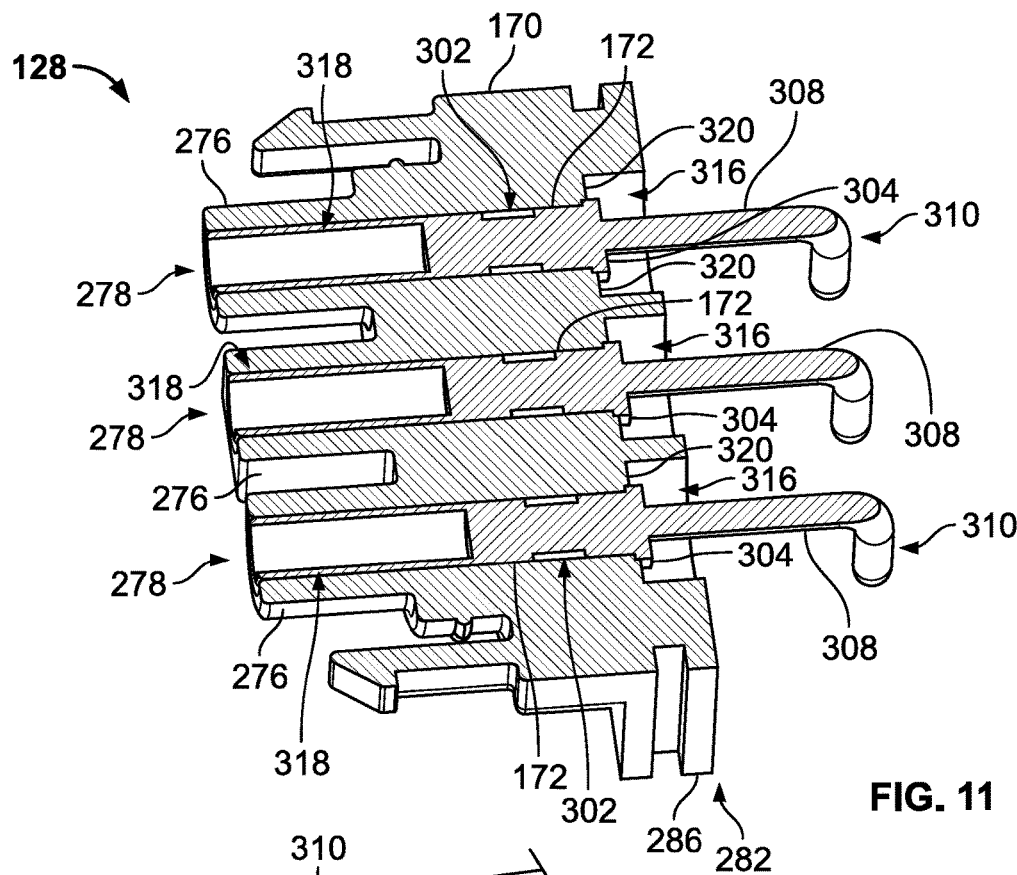
FIG. 11 is a cross-sectional isometric view of the AC power connector taken along the line 11-11 of FIG. 9.

FIG. 11 illustrates a cross-sectional view of the AC power connector 128 according to some embodiments of the invention. As shown, the connector pins 172 can be inserted into their respective channels 278 of the plug members 276 so that each connector pin axis is collinear with each channel axis. In the illustrated embodiment, each channel 278 includes a first portion 316 and a second portion 318 separated by a step 320. As shown, the first portion 316 is generally wider in cross section than the second portion 318.

When each connector pin 172 is inserted the respective channel 278 and secured to the AC power connector body 170, each annular protruded portion 304 abuts the respective step 320 and each annular recessed portion 302 is seated within the respective second portion 318 of the channels 278. Each of the second portions 318 may include an annular or partial inward protrusion configured to interface with the recessed portion 302 of the connector pin 172 to releasably couple the connector pin 172 in the respective channels 278. Each connection element 308 extends through the respective first portion 316 of the channels 278 and outside of the channels 278 proximate to the base 282. Each terminal end 310 is positioned outside the respective channel 278 and generally extends toward the flat surface 286 of the AC power connector body 170. The direction that the terminal ends 310 extend may be dictated by the connection orientation of the AC power connector body 170 relative to the circuit board 124. Therefore, in other embodiments, the terminal ends 310 may extend in different directions than shown in FIG. 11, as will be described in detail below.

Like the DC power connector 126, some embodiments of the AC power connector 128 can include alignment features. Alignment features can rotationally orient each terminal end 310 with respect to the AC power connector body 170 to facilitate electrically coupling the AC power connector 128 to the circuit board 124 during a manufacturing process. Such alignment features can include ridges, notches, protrusions, recesses, etc. formed in one or both of the AC power connector body 170 or the connector pins 172.

Figure 12:
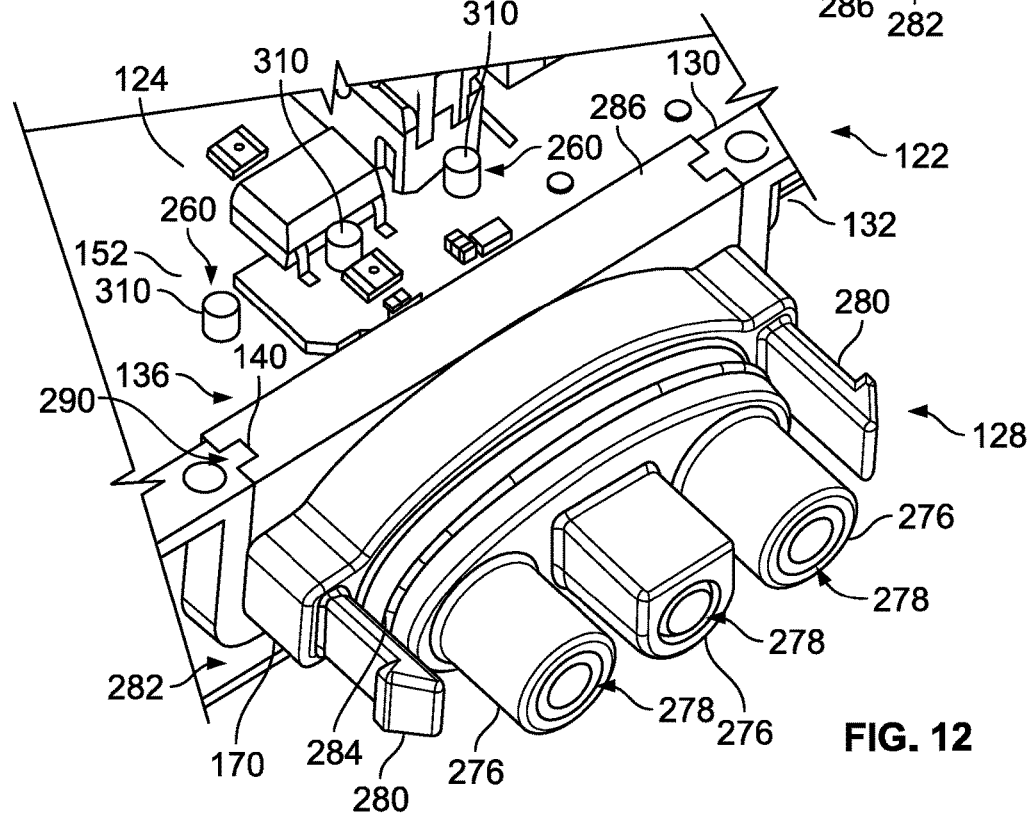
FIG. 12 is an isometric partial view of the AC power connector engaged with the circuit board of the microinverter of FIG. 2.

FIG. 12 illustrates the AC power connector 128 electrically coupled to the circuit board 124 and secured to the housing 122 at the second notch 136 formed in the body 130. The AC power connector 128 can be secured within the second notch 136 so that the second protrusion 140 is seated within the groove 290 of the base 282 (e.g., forming a tongue and groove-type fit). Similar to the DC power connector 126, when the AC power connector 128 is secured to the housing 122, the interface between the curved surface 288 of the base 282 and the second notch 136 can include one or more of a seal, sealant, or adhesive. The one or more of the seal, sealant, or adhesive can facilitate securing the AC power connector 128 to the housing 122 and provide a barrier between the exterior surface 132 of the body 130 and the interior volume. Similarly, when the AC power connector 128 is secured to the housing 122, the flat surface 286 can engage the lid 142, similarly to the flat surface 198 of the DC power connector 126.

Like the DC power connector 126, portions of the connection elements 308 extend beyond their respective channels 278. The portions that extend beyond the AC power connector body 170 extend similarly under the circuit board 124 and engage recesses 260 formed in the circuit board 124. Details and alternatives described above regarding the electrical coupling of the connection elements 218, 232 of the DC power connector 126 to the circuit board 122 can be applied to the connection elements 308 of the AC power connector 128.

As described above, the AC power connector 128 can be electrically coupled to the circuit board 124 via the connector pins 172 and secured to the housing 122 of the microinverter 120. Some embodiments of the invention also include an AC power interface that can be selectively coupled to the AC power connector 128. In some embodiments, DC power can be converted via the microinverter 120 to AC power that can be transferred via contact of the AC power connector 128 and an AC power interface.

Figure 13:
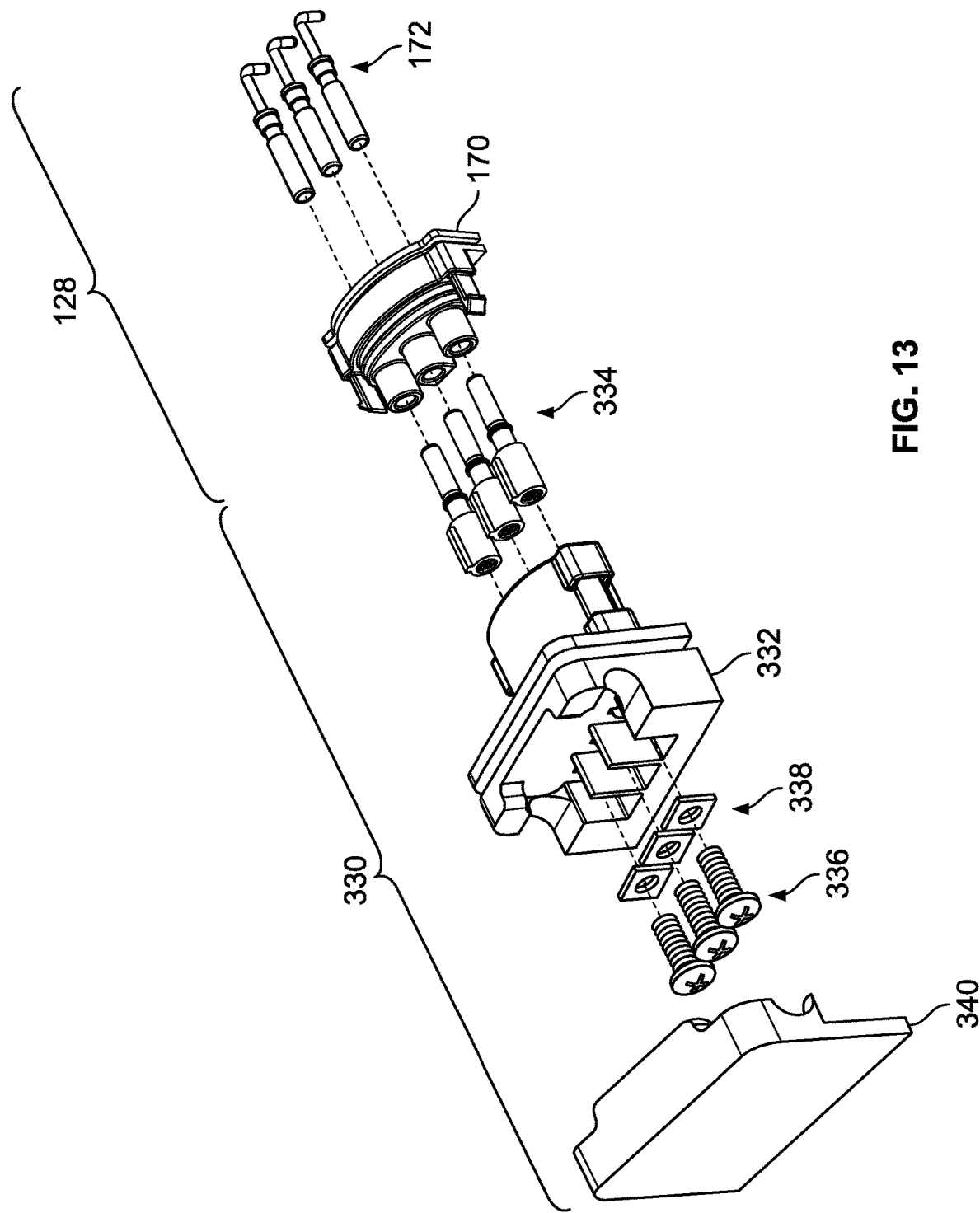
FIG. 13 is an exploded front isometric view of the AC power connector of FIG. 9 and an AC power interface.
Figure 14:
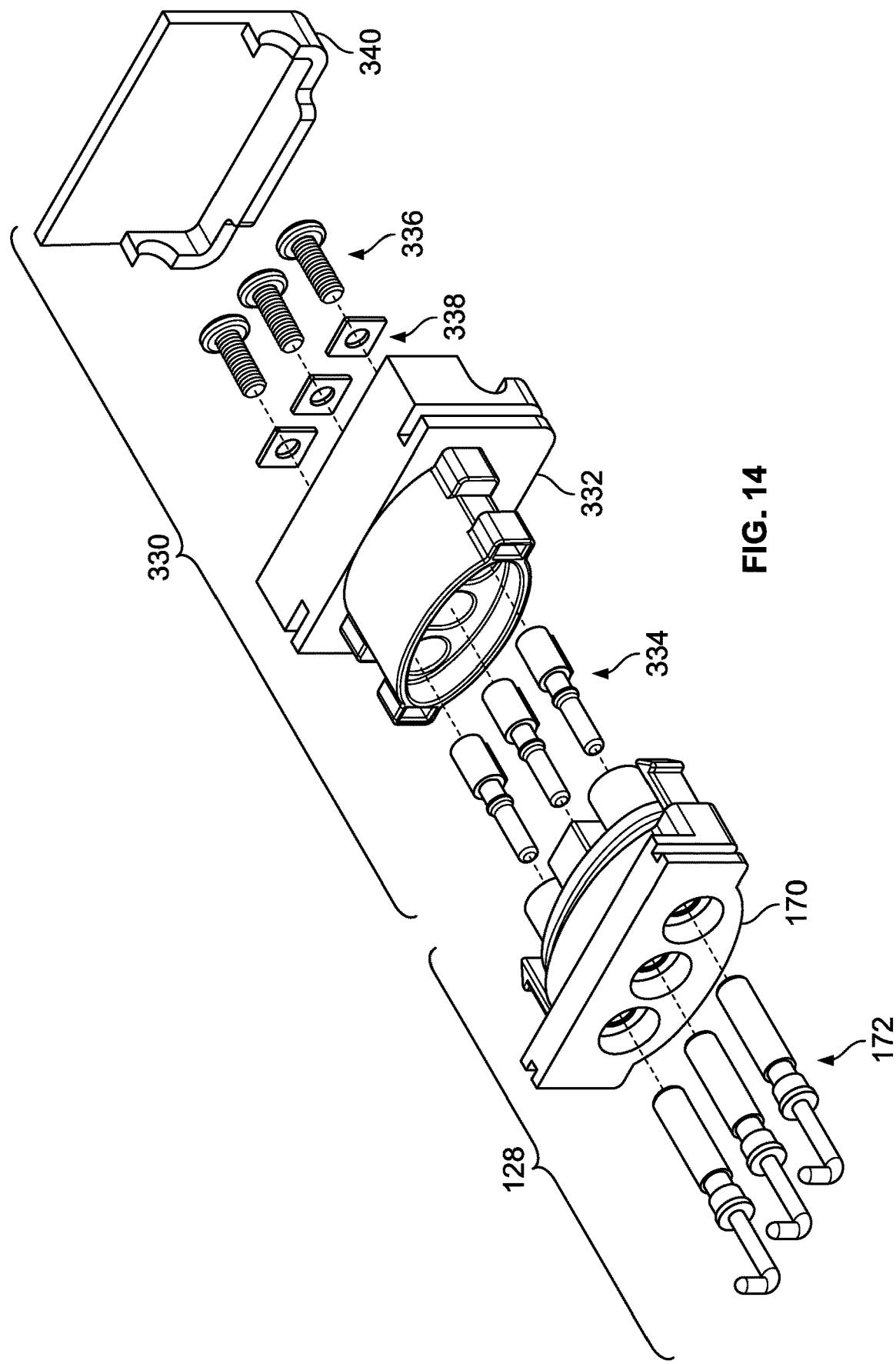
FIG. 14 is an exploded rear isometric view of the AC power connector and the AC power interface of FIG. 13.

FIGS. 13 and 14 illustrate an AC power interface 330 according to some embodiments of the invention. The AC power interface 330 includes an interface body 332, interface pins 334, screw terminals 336, terminal plates 338, and a back plate 340. In general, the AC power connector 128 can be configured as a female pin connector dimensioned to engage the AC power interface 330, which can be generally configured as a male pin connector.

Figure 15:
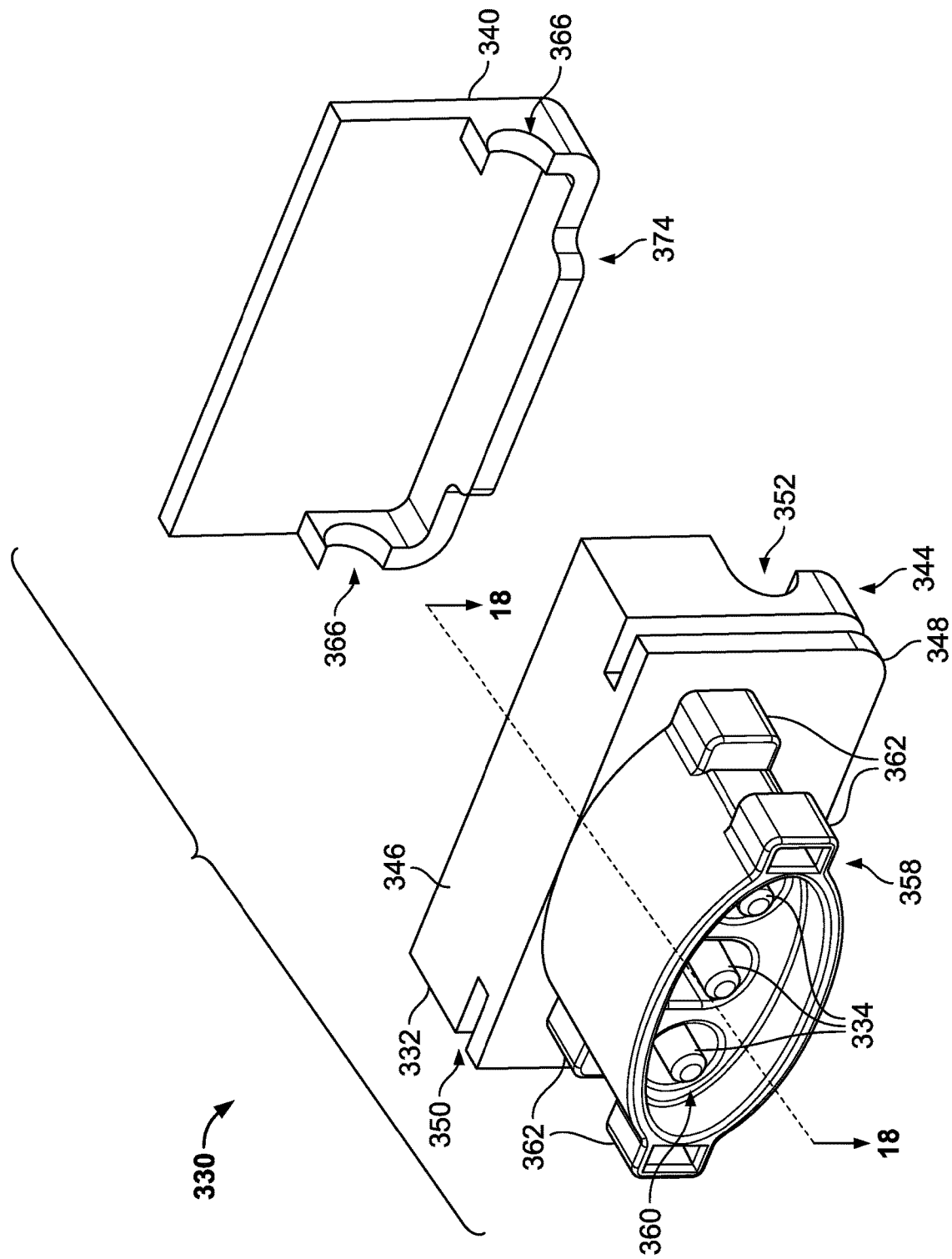
FIG. 15 is a partially exploded isometric view of the AC power interface of FIG. 13.

FIG. 15 illustrates a partially exploded view of the AC power interface 330 of FIGS. 13 and 14. The interface body 332 includes a base 344 that has a flat surface 346 and a curved surface 348 that extends around the base 344 and connects to the flat surface 346. The curved surface 348 includes a groove 350 formed therein. The base 344 also includes notches 352 formed on lateral sides of the interface body 332. The interface body 332 further includes a receiving portion 358 that includes channels 360 and connector receptacles 362. The channels 360 are dimensioned to each receive a respective plug member 276 of the AC power connector 128. The channels 360 are also configured to centrally receive the interface pins 334. The connector receptacles 362 are configured as male connector receptacles and can receive a pair of arms, such as the arms 280 of the AC power connector 128, for example.

Figure 16:
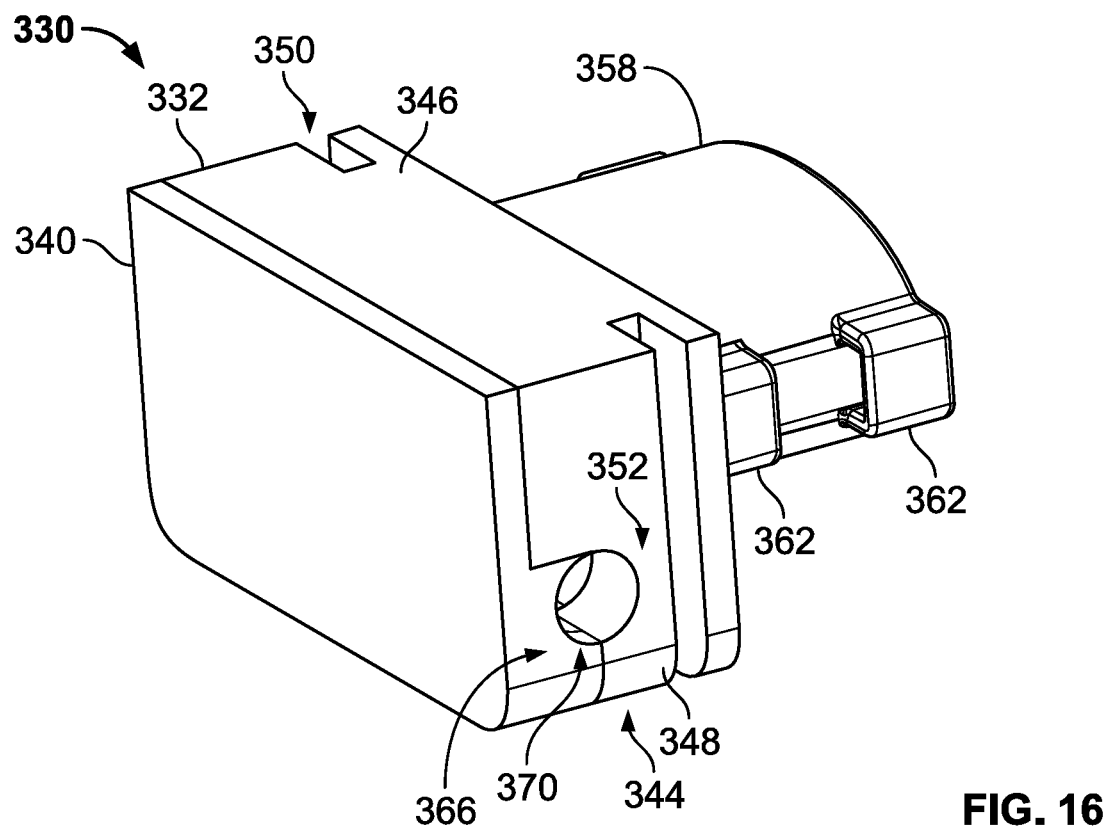
FIG. 16 is a rear isometric assembled view of the AC power interface of FIG. 13.

Referring to FIGS. 15 and 16, the back plate 340 includes notches 366 that correspond to the notches 352 formed in the interface body 332. As illustrated in FIG. 16, when the back plate 340 is engaged with the interface body 332, and the notches 352, 366 are aligned, each of the notches 352, 366 form holes 370. Each hole 370 can be configured as a wire hole. In particular, the holes 370 can be inlet or outlet wire holes, which may be used to daisy-chain several microinverters in parallel, for instance. The back plate 340 generally includes a mating profile 374 that is dimensioned to engage the interface body 332 proximate to the base 344. The back plate 340 can be secured to the interface body 332 via an interference fit, fasteners, adhesives, etc. to, in some forms, establish a seal between one or more wires passing through the holes 370. The back plate 340 and the interface body 332 may be configured to establish sealing engagement, such as through use of a cooperating groove and gasket construction.

Figure 17:
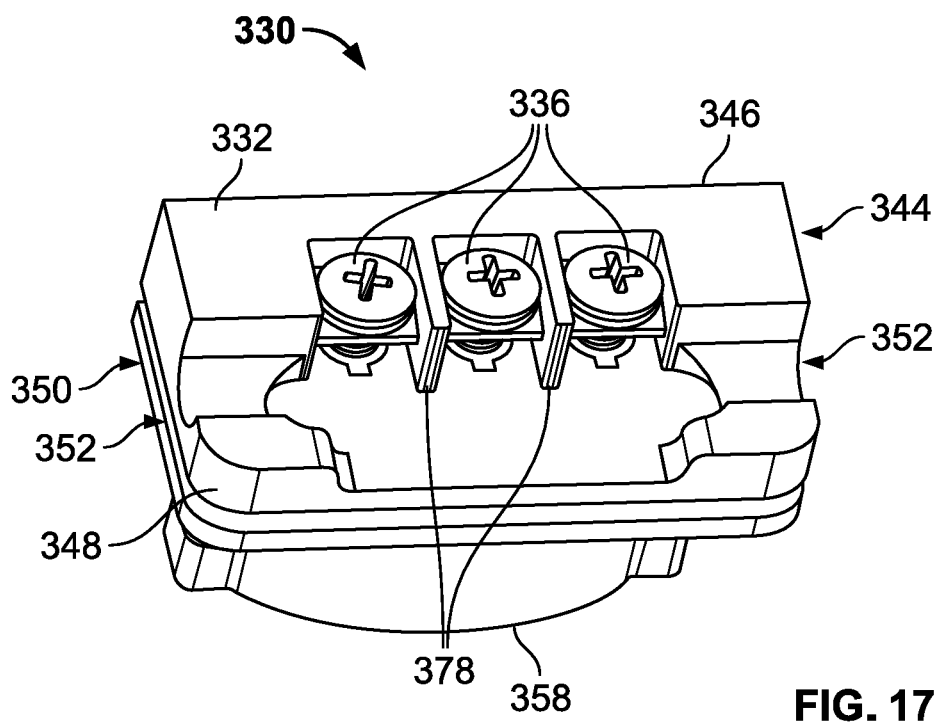
FIG. 17 is a rear isometric view of an interface body of the AC power interface of FIG. 16.

FIG. 17 illustrates the base 344 of the interface body 332 with the back plate 340 removed. In general, the back plate 340 provides a covering for a portion of the base 344 of the interface body 332. In particular, the back plate 340 can cover the screw terminals 336. The screw terminals 336 are separated by terminal dividers 378 that can reduce unwanted electrical contact between electrical components, such as wires.

Figure 18:
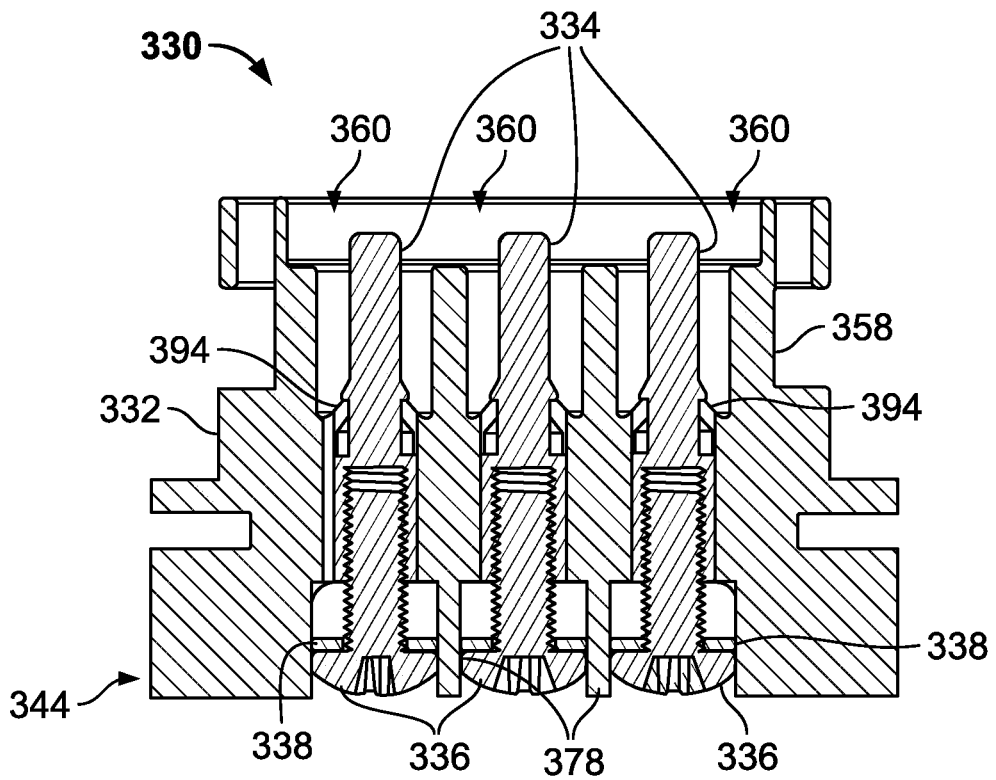
FIG. 18 is cross-sectional top view of the interface body taken along line 18-18 of FIG. 15.

As illustrated in FIG. 18, when the screw terminals 336 are engaged with the interface body 332, the terminal plates 338 can be sandwiched between the screw terminals 336 and the interface body 332. The screw terminals 336 include external threads that are dimensioned to extend into the interface pins 334 within the channels 360.

Figure 19:
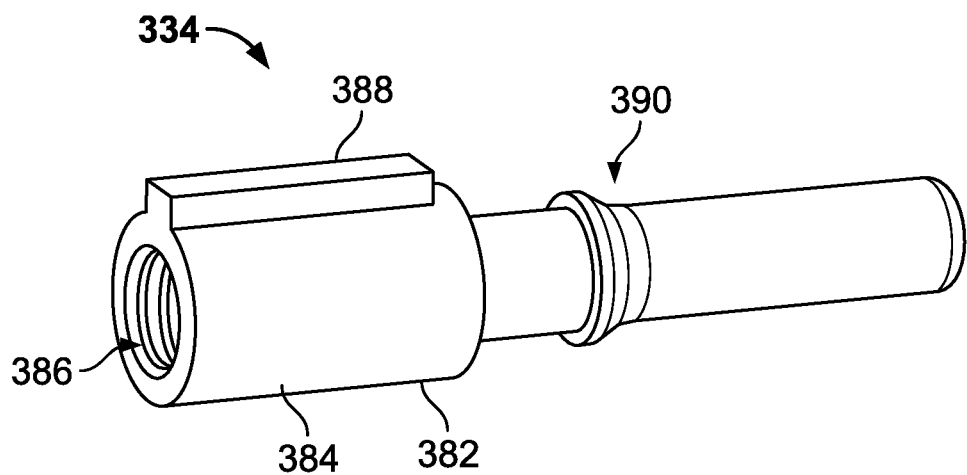
FIG. 19 is an isometric view of an interface pin of the AC power interface of FIG. 13.

FIG. 19 illustrates one of the interface pins 334 of the AC power interface 330. Each of the interface pins 334 can be substantially similar, therefore the description of a single interface pin 334 can apply to each of the interface pins 334. The interface pin 334 includes a pin body 382 that defines an interface pin axis. The pin body 382 includes an outer surface 384 and an internally threaded channel 386. The internally threaded channel 386 is dimensioned to receive the external threads of the screw terminals 336. The outer surface 384 includes a ridge 388 that extends parallel to the interface pin axis. The outer surface 384 also includes a ramped annular protrusion 390.

Referring back to FIG. 18, the ramped annular protrusion 390 is configured to engage a lock member 394 formed within the channel 360 of the AC power interface 330. The ramped annular protrusion 390 can move past the lock member 394 in a first direction as the interface pin 334 is inserted into the channel 360. Once inserted, the interface pin 334 is inhibited from being unintentionally moved in a second direction out of the channel 360 via the ramped annular protrusion 390 engaging the lock member 394.

Figure 20:
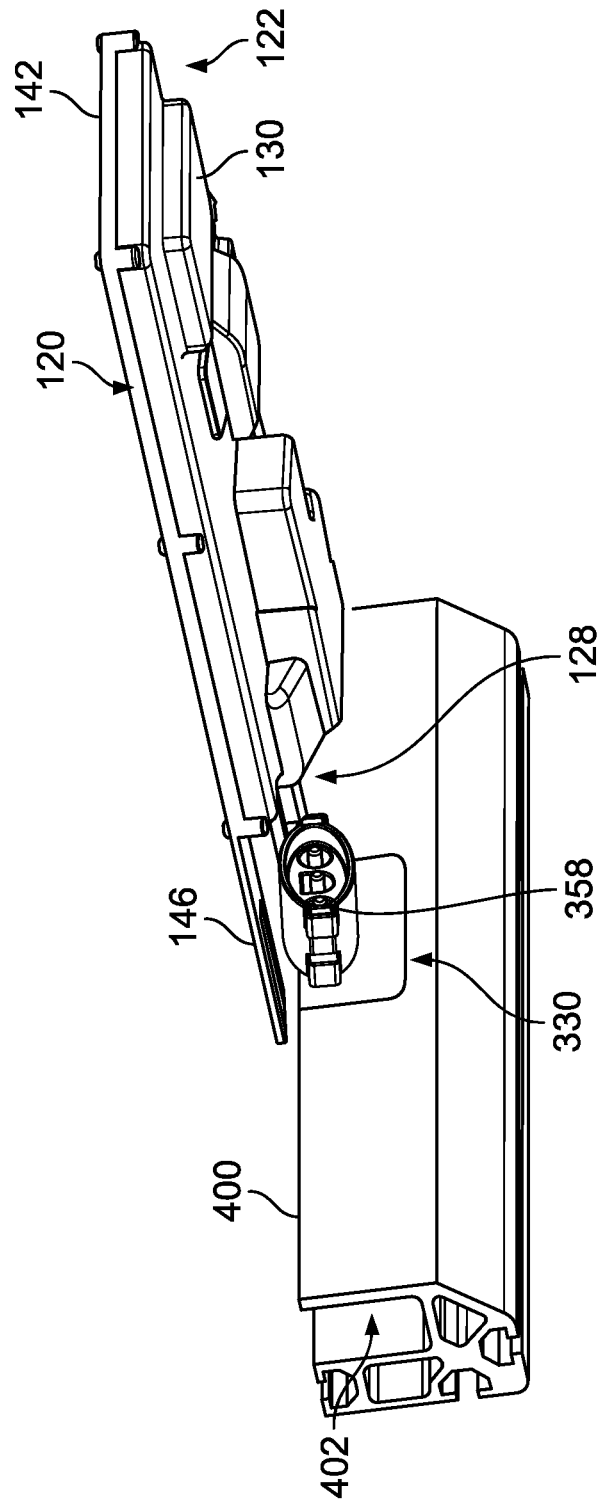
FIG. 20 is an exploded bottom isometric view of the microinverter of FIG. 2 and the AC power interface of FIG. 13 secured to a rail.

In some embodiments, the AC power interface 330 can be secured to structure, such as a beam or a rail. For example, FIG. 20 illustrates the microinverter 120 and the AC power interface 330 coupled to a rail 400. The rail 400 includes a channel 402. The channel 402 is configured to have wire ran therethrough, which can be electrically coupled to the AC power interface 330. The wire may enter or exit the AC power interface 330 at the holes 370 and can be electrically coupled to the AC power interface 330 via the screw terminals 336. The microinverter 120 can then be electrically coupled to the wires via the connection of the AC power connector 128 and the AC power interface 330.

Figure 21:
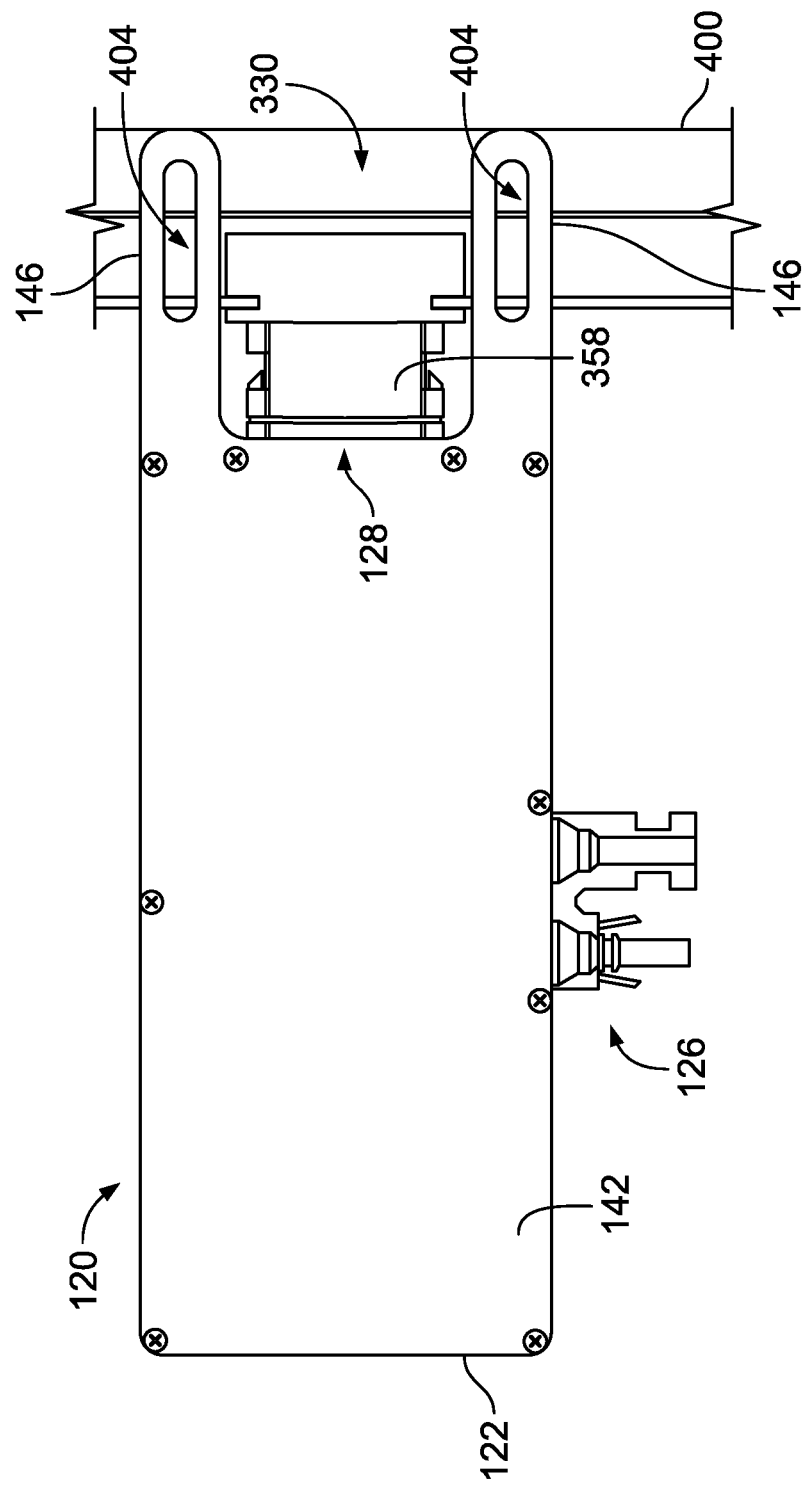
FIG. 21 is a top view of the microinverter engaged with the rail of FIG. 20.

As illustrated in FIG. 21, the housing 122 of the microinverter 120 can be secured to the rail 400 via the mount arms 146. In general the mount arms 146 are configured as housing-integrated mounting brackets. The mount arms 146 include mounting apertures 404 through which a fastener (e.g., screws, bolts, etc.) can extend to engage with the rail 400 to secure the housing 122 to the rail 400. In other embodiments, the housing 122 can include an interface structure that may be clipped, wedged, clamped, etc. to a supporting structure.

Now that embodiments of the microinverter 120, including the DC power connector 126 and the AC power connector 128, have been described above, additional embodiments of the invention will be described below. In the following embodiments, various features and aspects described below can be applied to embodiments of the microinverter 120, and, in particular, the DC power connector 126 and the AC power connector 128 described above. Likewise, features and aspects of the following embodiments below that are substantially similar to those of the microinverter 120 will be omitted to avoid repetition.

Figure 22:
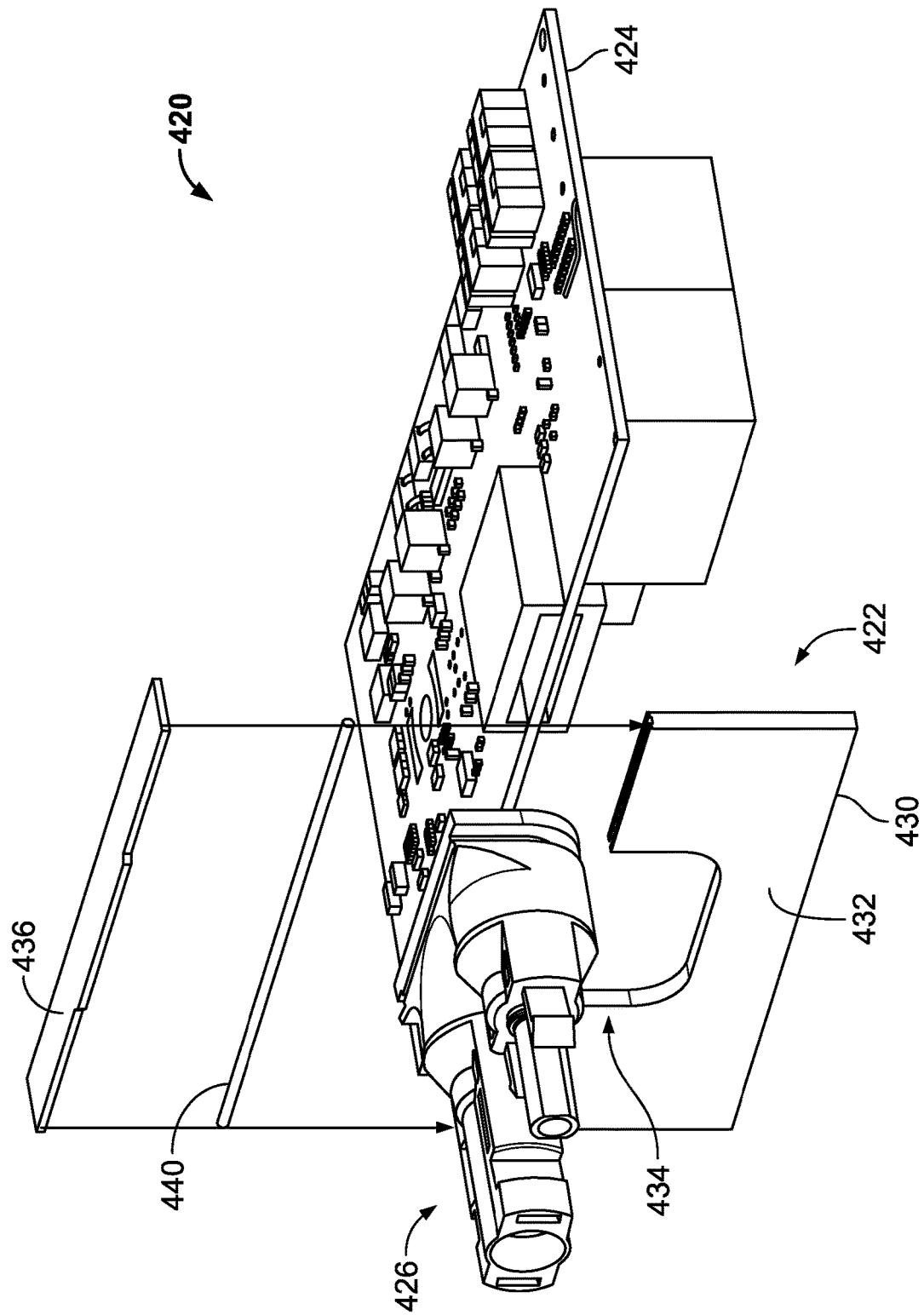
FIG. 22 is an exploded isometric partial view of components of a microinverter according to another embodiment of the invention.

FIG. 22 illustrates components of a microinverter 420 according to one embodiment of the invention. The microinverter 420, among other components, includes a housing 422, a circuit board 424, and a DC power connector 426. In the illustrated embodiment, the housing 422 includes a body 430 having an exterior surface 432 and a notch 434 formed therein. The housing 422 also includes a lid 436. Each of the body 430 and the lid 436 of the housing 422 are only partially represented in FIG. 22 and the housing 422 is configured to enclose components of the microinverter 420, similar to the housing 122. The housing 422 further includes a seal 440 configured as a gasket that can be seated between the body 430 and the lid 436.

Figure 23:
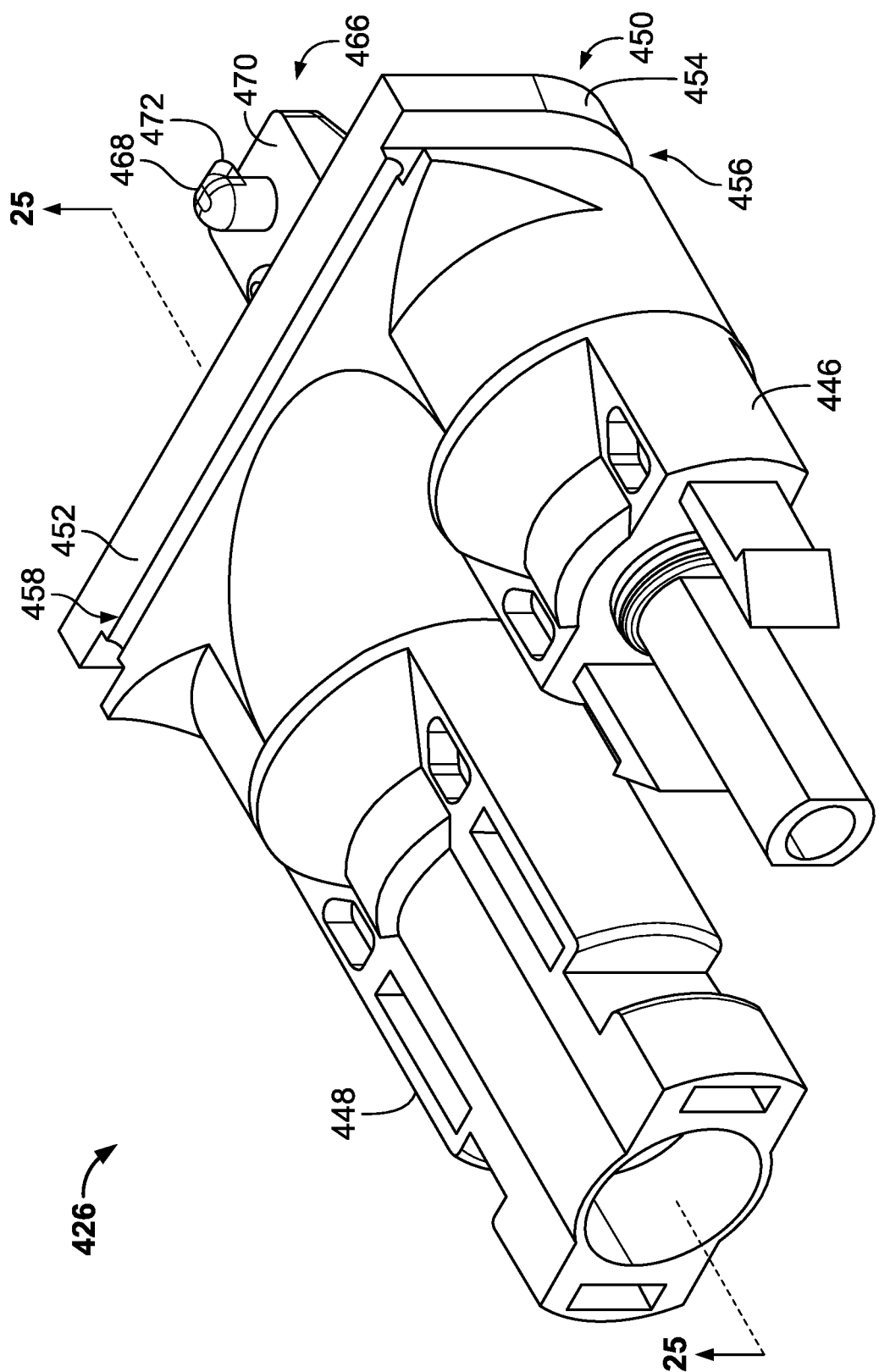
FIG. 23 is a front isometric view of a DC power connector of the microinverter of FIG. 22.
Figure 24:
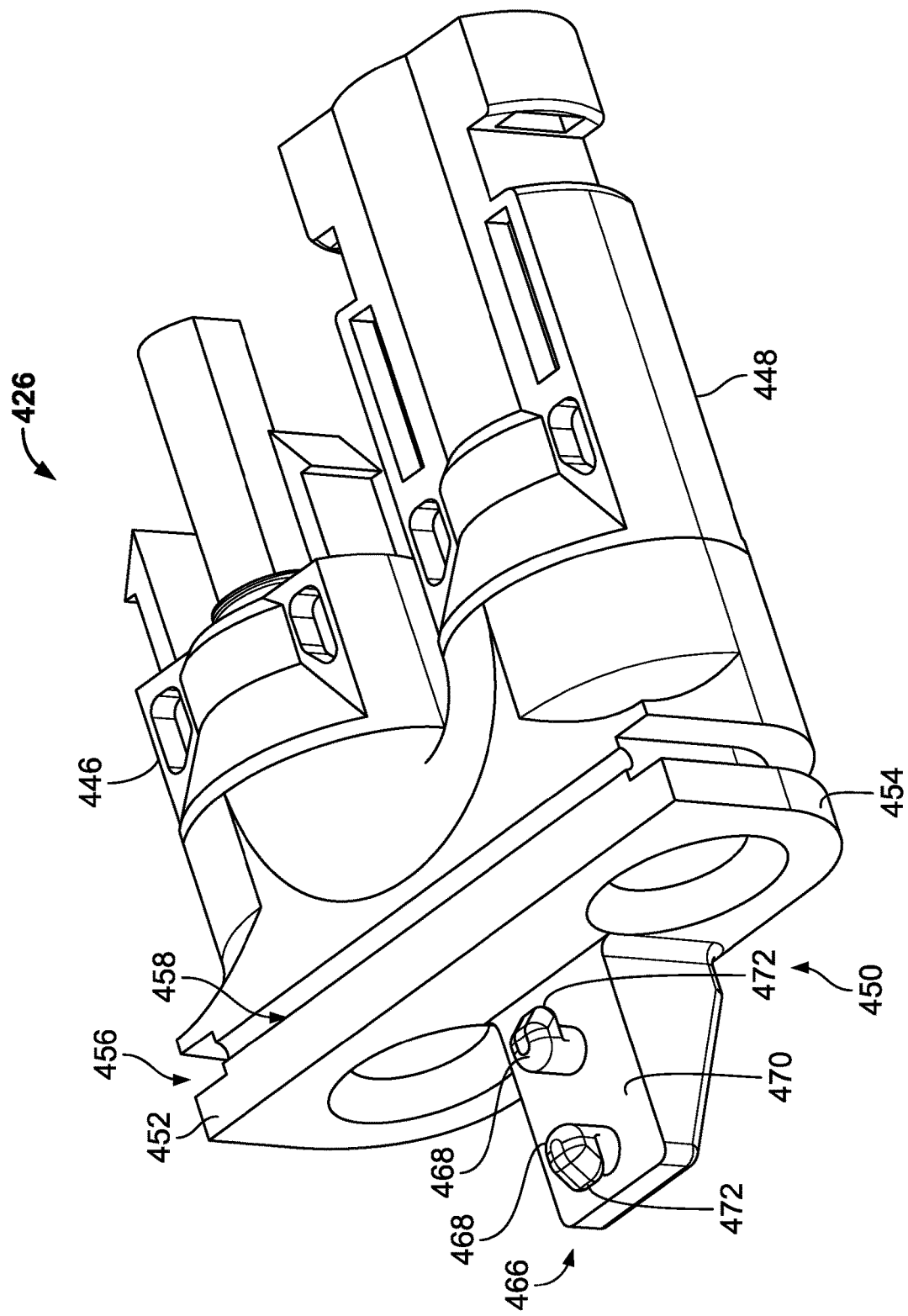
FIG. 24 is a rear isometric view of a DC power connector of the microinverter of FIG. 22.

FIGS. 23 and 24 illustrate the DC power connector 426. Like the DC power connector 126, the DC power connector 426 includes a first plug 446 and a second plug 448 that extend from a base 450. The base 450 includes a flat surface 452 and a curved surface 454 that extends around the base 450 and connects to the flat surface 452. The curved surface 454 includes a profile that is similarly shaped to the notch 434 in the housing 422 and defines a groove 456. The flat surface 452 includes a channel 458 that intersects the groove 456. The channel 458 is dimensioned to receive the seal 440 when the DC power connector 426 is secured to the housing 422 and the lid 436 is secured to the body 430.

With reference to FIG. 24, the base 450 also includes a securing portion 466 that extends from the base 450 in a direction opposite the first and second plugs 446, 448. The securing portion 466 includes protrusions 468 that extend generally perpendicular from a mate surface 470 of the securing portion 466. The mate surface 470 is generally parallel to channel axes that are defined by the first and second plugs 446, 448. In one embodiment, the mate surface 470 is configured to engage and support a surface of the circuit board 424 (along with the mechanical interaction of the protrusions 468 and circuit board 424), thus helping accommodate mechanical forces (e.g., stresses) at the interfaces. In the illustrated embodiment, the securing portion 466 includes a pair of protrusions 468. However, in other embodiments, more or fewer protrusions are possible. The protrusions 468 include a lip 472 that is configured to create a snap fit with recesses formed in the circuit board 424, as will be described in detail below. In one alternative embodiment, the example securing portion 466 concept may be incorporated into the DC power connector 126 and the AC power connector 128 illustrated in FIG. 2. For instance, the securing portion 466 may be integrally molded (e.g., via injection molding) with the overall example DC power connector body 160 and the AC power connector body 170 to provide enhanced integrity to the connections between the circuit board 124 and the DC power connector 126 and the AC power connector 128.

Figure 25:
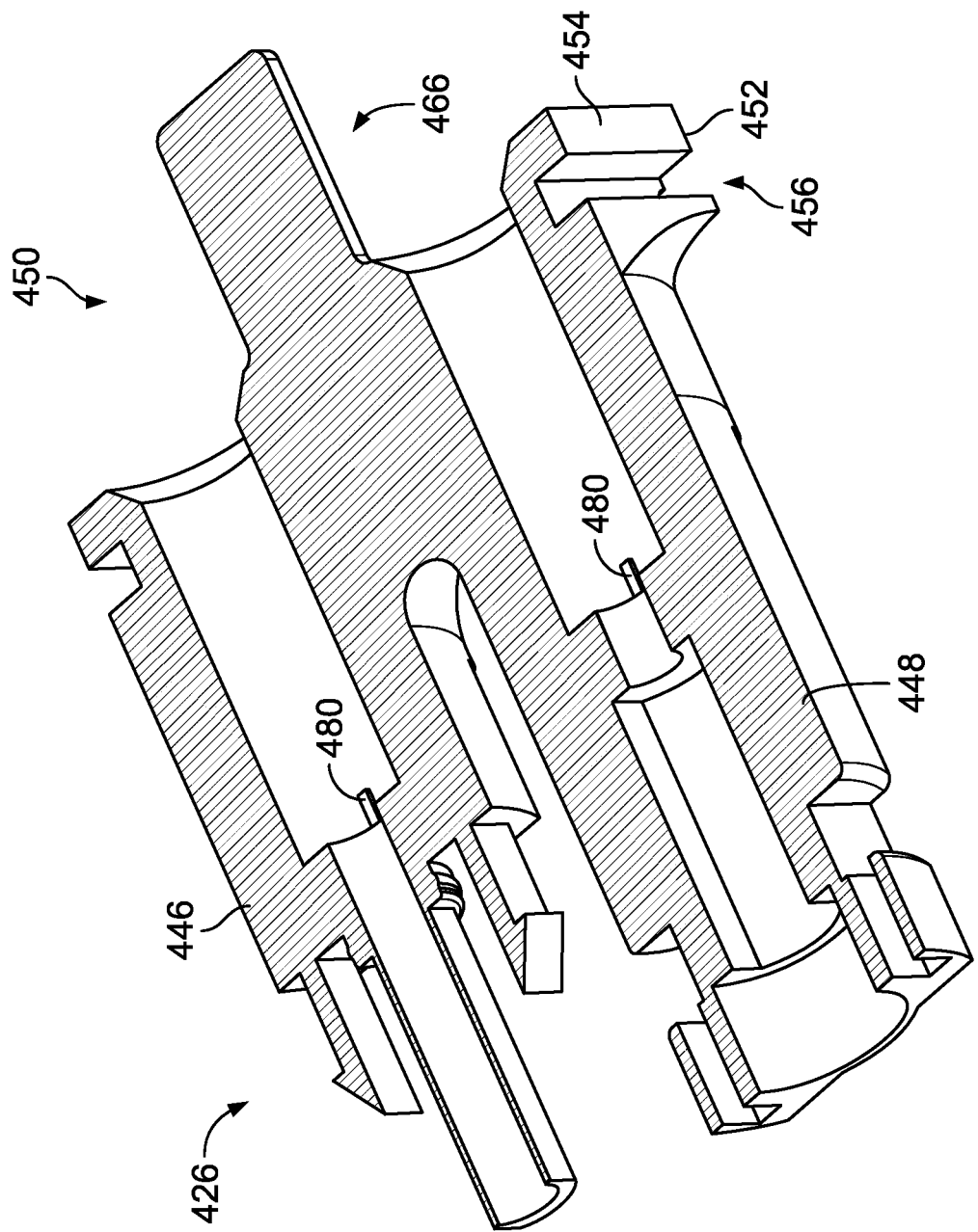
FIG. 25 is a cross-sectional isometric view of the DC power connector taken along line 25-25 of FIG. 23.

FIG. 25 illustrates a cross-sectional view of the DC power connector 426 according to one embodiment of the invention. The DC power connector 426 includes a tooth 480 formed in each of the channels defined by the first and second plugs 446, 448. Each tooth 480 can be integrally formed with the body of the DC power connector 426. Each tooth 480 is configured as a pin alignment feature and can be dimensioned to engage a corresponding alignment feature formed in a pin (see, for example, notch 498 in FIG. 27). Each tooth 480 is capable of facilitating a manufacturing process of the microinverter 420 by correctly orienting pins, such as the first and second pins 486, 488 illustrated in FIG. 26, rotationally relative to the circuit board 424 within the DC power connector 426 prior to securing the DC power connector 426 to the circuit board 424. For example, the first and second pins 486, 488 may be oriented to facilitate alignment and coupling of respective terminal ends of each of the first and second pins 486, 488 with a desired recess positioned on the circuit board 424. The specific form factors of the cooperating pin alignment feature of the connector (e.g., tooth 480) and the alignment feature of the pin (e.g., notch 498) can take a variety of functional forms, such as arcuate, beveled, angled, tapered, keyed, and the like, with each being configured to establish the desired relative positioning of the pin within the connector.

Figure 26:
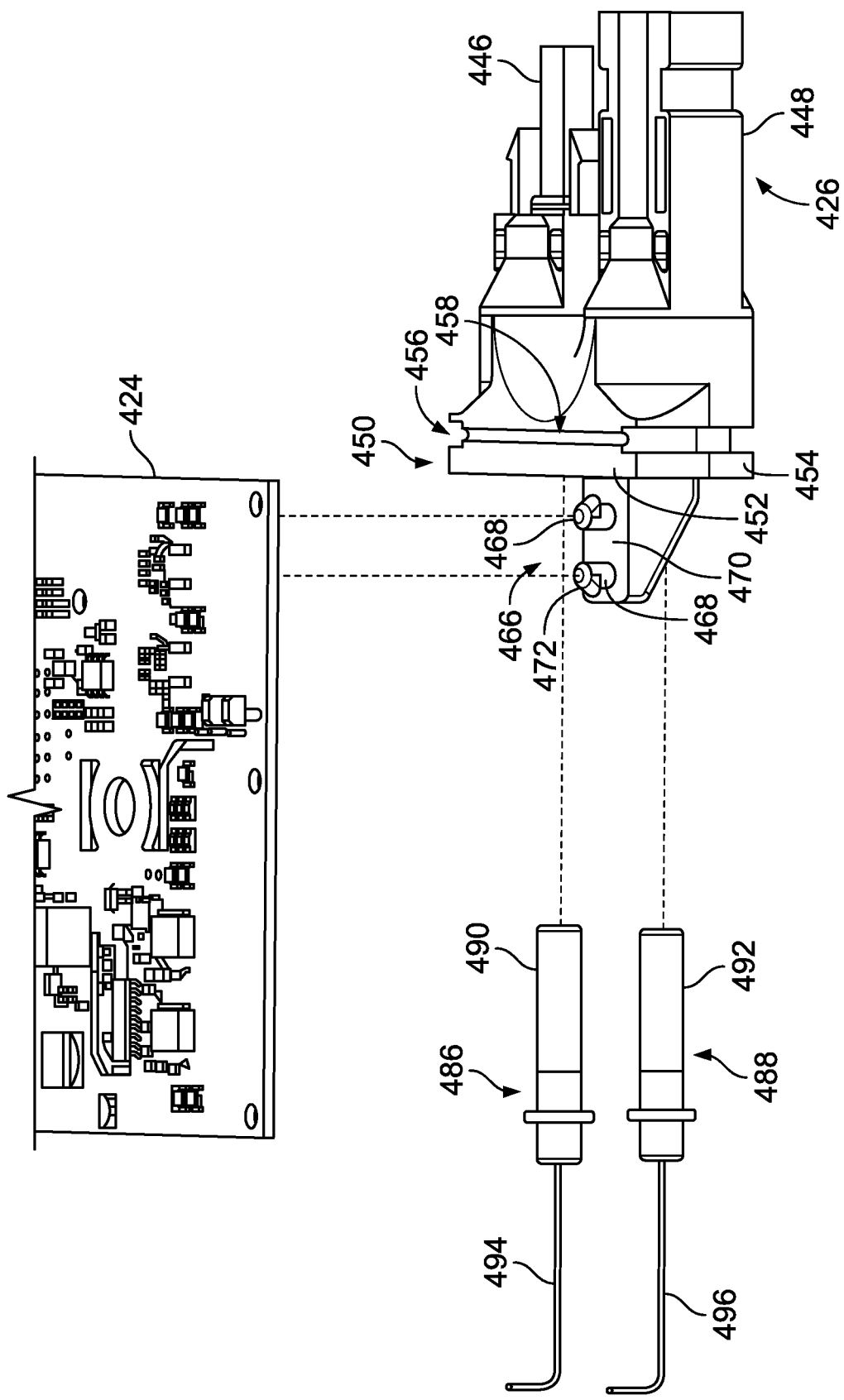
FIG. 26 is an exploded isometric view of components of the microinverter of FIG. 22.

FIG. 26 illustrates components of the microinverter 420 including the circuit board 424, the DC power connector 426, and the first and second pins, 486, 488. The first and second pins 486, 488 each include respective pin bodies 490, 492 and respective connection elements 494, 496. The first and second pins 486, 488 are similar to the first and second pins 162, 164 of the DC power connector 126. Likewise, the pin bodies 490, 492 engage the DC power connector 426 similarly to the DC power connector 126, and can be inserted proximate to the base 450. In one embodiment, the first and second connection elements 494, 496 provide a solder location when the DC power connector 426 is coupled to the circuit board 424.

Figure 27:
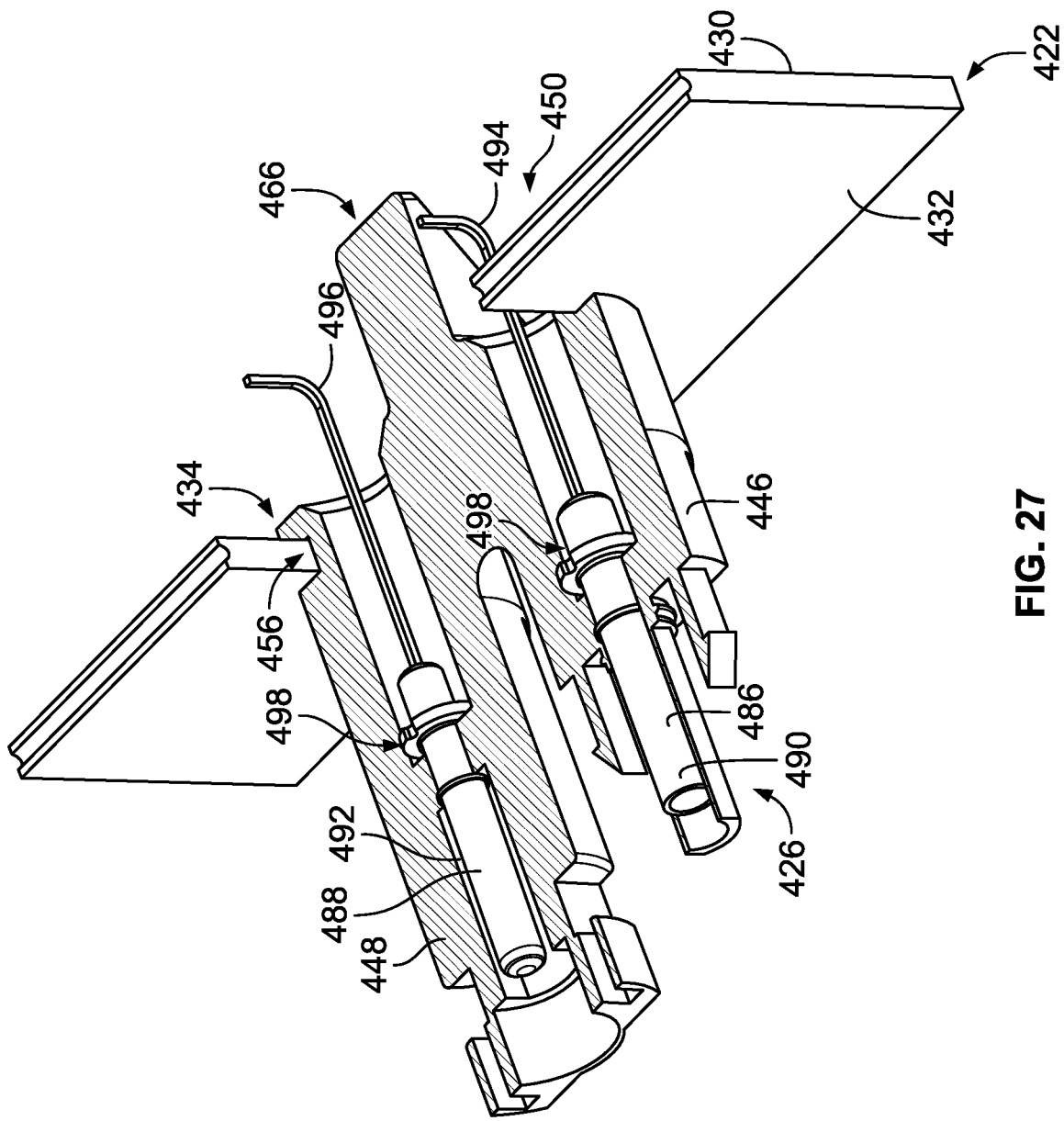
FIG. 27 is cross-sectional isometric partial view of components of the microinverter of FIG. 22.

FIG. 27 illustrates the first and second pins 486, 488 seated in the channels formed by the first and second plugs 446, 448. As briefly described above, each of the first and second pins 486, 488 include a notch 498. Each notch 498 is configured as an alignment feature that can engage each tooth 480 to rotationally orient the first and second pins 486, 488 within the DC power connector 426. Also as illustrated, each of the first and second connection elements 494, 496 extend through the notch 434 formed in the body 430 of the housing 422. Likewise, the securing portion 466 extends through the notch 434 from the exterior surface 432 to the interior volume of the housing 422 to support and engage the circuit board 424, as well as help orient the first and second pins 486, 488 for electrical coupling to the circuit board 424. When the DC power connector 426 is secured to the housing 422, a portion of the notch 434 is seated in the groove 456 of the DC power connector 426.

Figure 28:
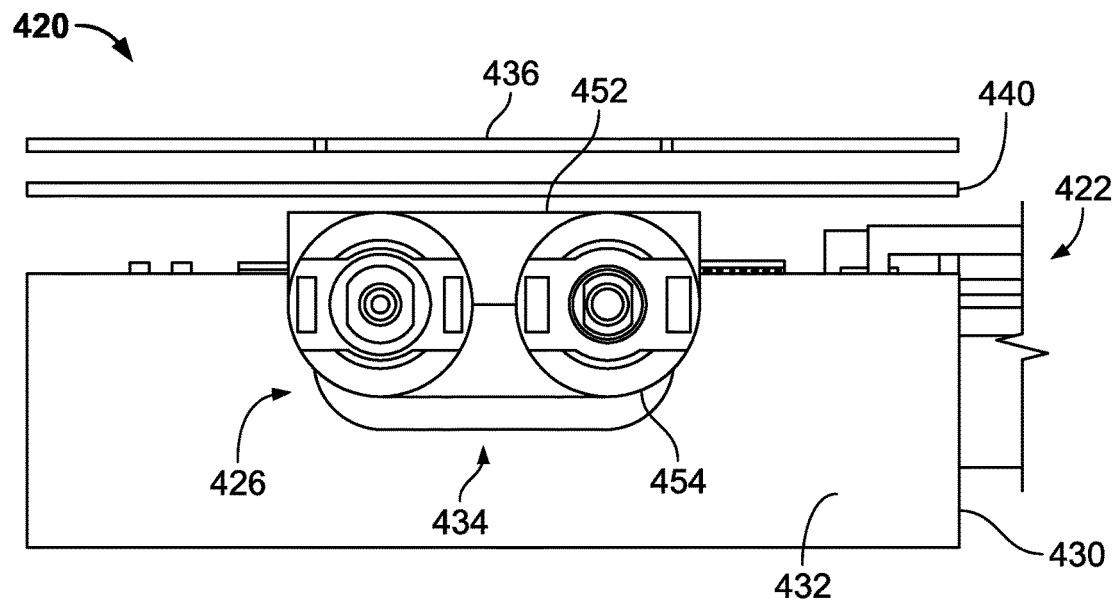
FIG. 28 is an exploded partial front view of the microinverter of FIG. 22.
Figure 29:
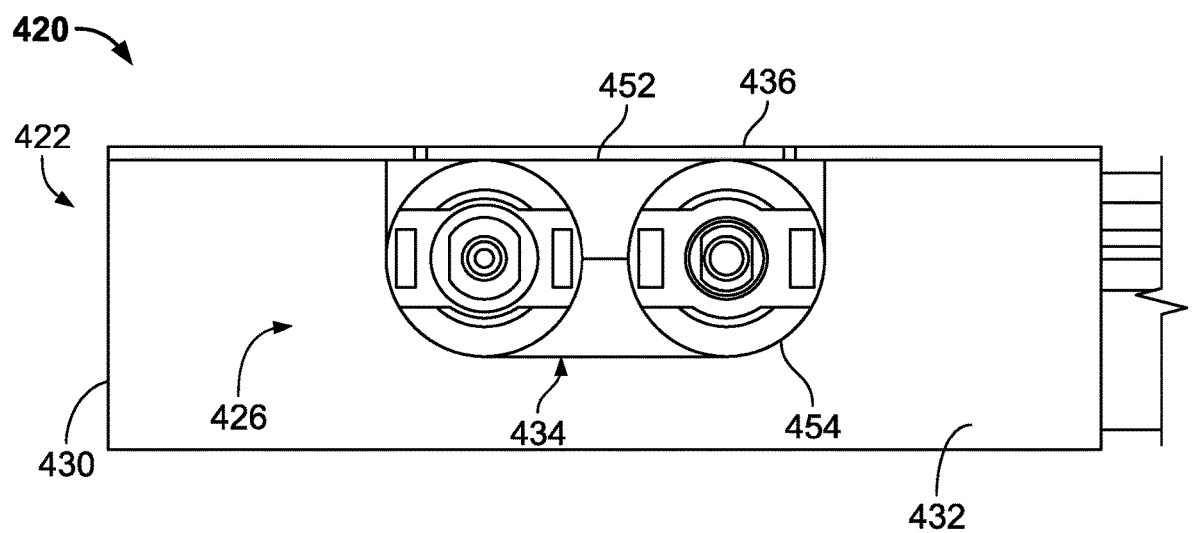
FIG. 29 is an assembled partial front view of the microinverter of FIG. 28.

FIGS. 28 and 29 illustrate a front portion of the microinverter 420 of FIG. 22. As briefly described above, the curved surface 454 of the DC power connector 426 has a similar shaped profile to the notch 434 formed in the body 430 of the housing 422. The corresponding profiles allow the DC power connector 426 to engage the housing 422. In some embodiments, the DC power connector 426 sealingly engages the housing 422. In some embodiments, the microinverter 420 can include a seal between the DC power connector 426 and the housing 422 to provide a barrier between the exterior surface 432 of the body 430 and the interior volume. Also as discussed above, the base 450 includes a channel 458 that is dimensioned to receive the seal 440 so that the flat surface 452 can sit flush with a portion of the body 430 and the lid 436 can engage the body 430 and the DC power connector 426 at the flat surface 452, as illustrated in FIG. 29.

Figure 30:
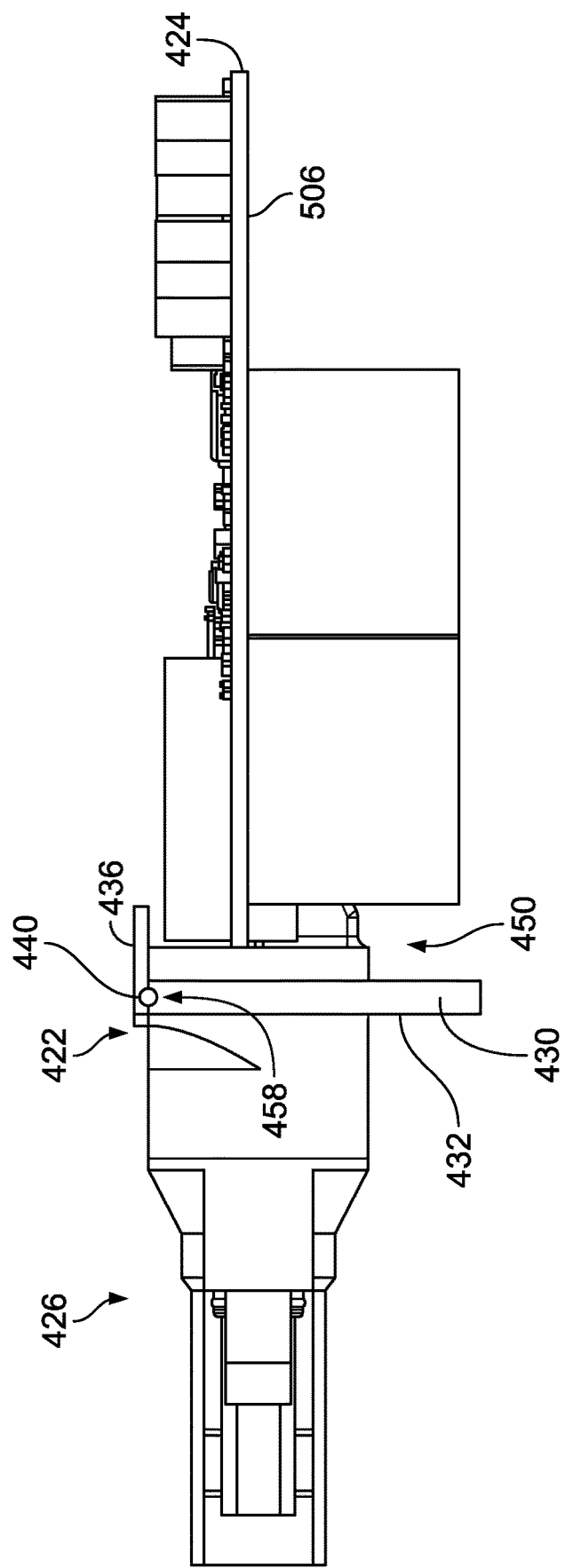
FIG. 30 is an assembled side view of components of the microinverter of FIG. 22.
Figure 31:
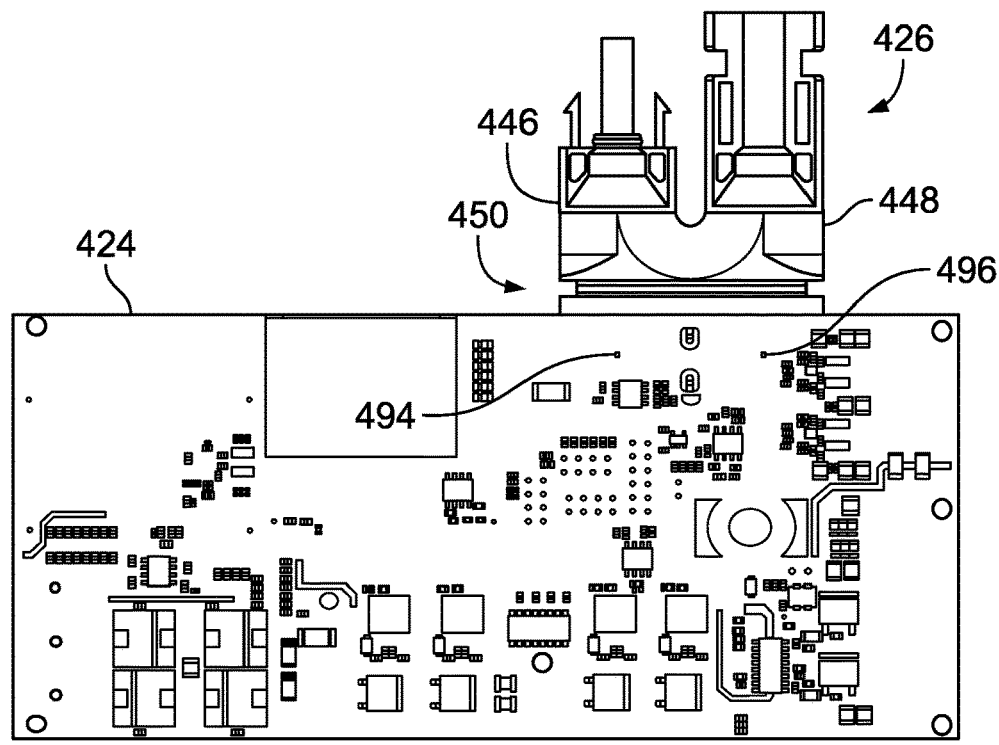
FIG. 31 is a top view of the DC power connector engaged with a circuit board of FIG. 22.

FIGS. 30 and 31 illustrate the DC power connector 426 secured and electrically coupled to the circuit board 424. FIG. 30 in particular illustrates the DC power connector 426 secured and electrically coupled to the circuit board 424 and a portion of the lid 436 secured to the body 430, thereby enclosing the circuit board 424 within the interior volume. FIG. 30 further illustrates the seal 440 positioned between the channel 458 formed in the flat surface 452 of the DC power connector 426 and/or the lid 436.

Figure 32:
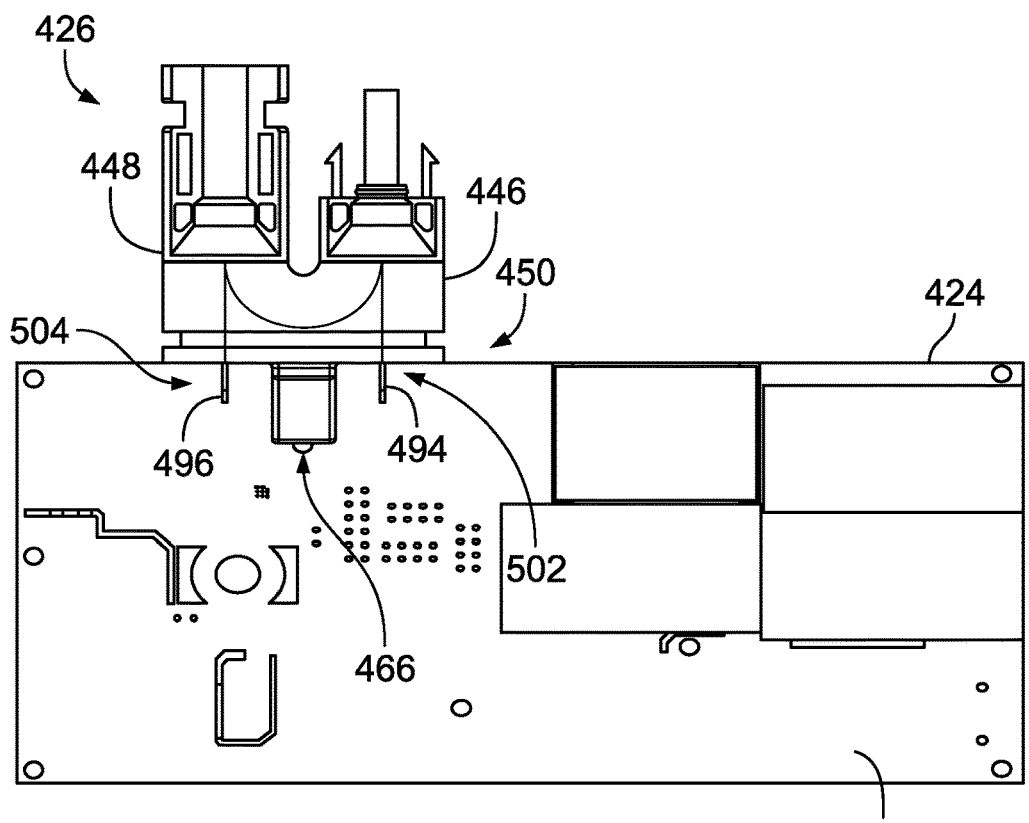
FIG. 32 is a bottom view of the DC power connector engaged with the circuit board of FIG. 31.

FIGS. 31 and 32 illustrate the DC power connector 426 secured to the circuit board 424 and first and second connection elements 494, 496 electrically coupled to the circuit board 424. As briefly described with respect to the first and second pins 162, 164 of the microinverter 120, portions of the first and second connection elements 218, 232 can extend under the circuit board 124 proximate to the bottom surface 154 of the circuit board. The first and second pins 486, 488 include a similar configuration. Illustrated in FIG. 32, portions 502 and 504 of the first and second connection elements 494, 496 extend below the circuit board 424 proximate to a bottom surface 506 of the circuit board. The first and second connection elements 494, 496 then extend through recesses formed in the circuit board 424, as can be seen in FIG. 31.

FIG. 32 further illustrates that when the DC power connector 426 is secured to the circuit board 424, the mate surface 470 of the securing portion 466 is engaged with the bottom surface 506 of the circuit board 424 and the protrusions 468 extend through the circuit board 424 and create a snap fit at the lips 472, as shown in FIG. 31. In general, the engagement of the circuit board 424 with the securing portion 466 of the DC power connector 426 provides a rigid connection that can be established before the circuit board 424 is inserted into the housing 422.

Figure 33:
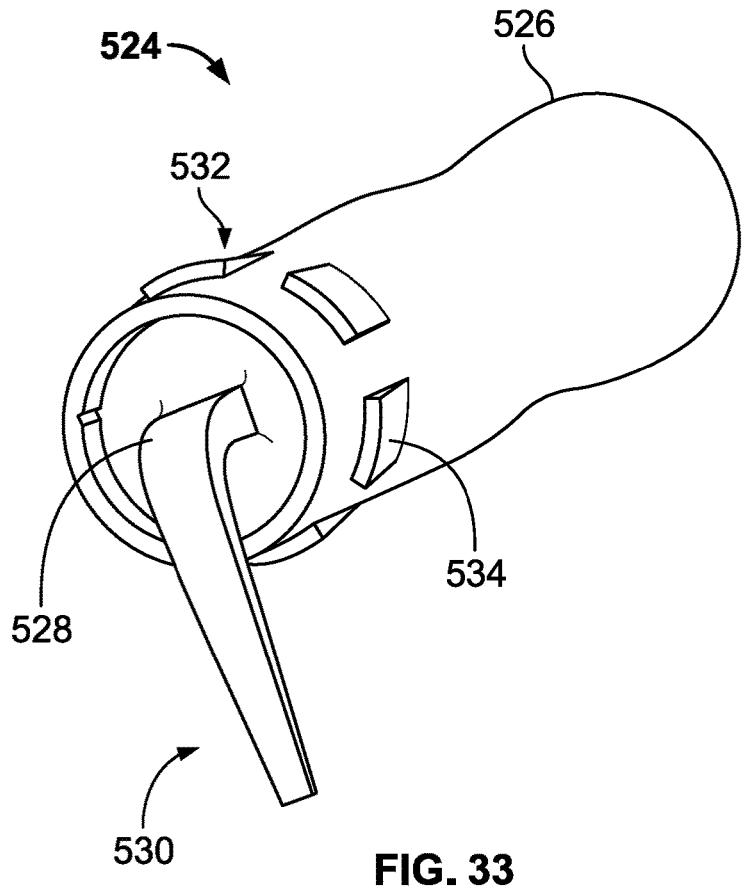
FIG. 33 is an isometric view of a pin according to some embodiments of the invention.
Figure 34:
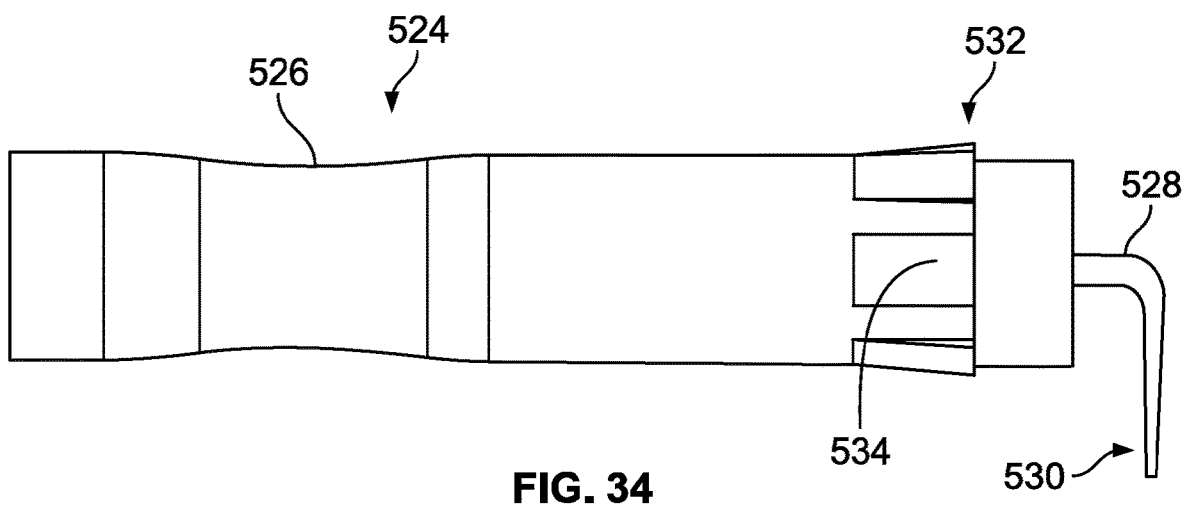
FIG. 34 is a side view of the pin of FIG. 33.

FIGS. 33 and 34 illustrate a connection pin 524 according to one embodiment of the invention. In some embodiments, the connection pin 524 can be used with either of the microinverters 120, 420, for example. The pin 524 includes a pin body 526 that defines a pin body axis. A connection element 528 extends from the pin body 526 along the pin body axis. The connection element 528 includes a terminal end 530 that is skewed relative to the pin body axis. In particular, the terminal end 530 is bent approximately 90 degrees from the pin body axis. The pin body 526 includes engagement tabs 532 that are spaced annularly about the pin body 526 and fan out radially to create a ramped portion 534. The connection pin 524 can be used with a power connector and the engagement tabs 532 can provide an engagement feature so that the connection pin 524 can only be moved through a channel of a power connector in a single direction.

Figure 35:
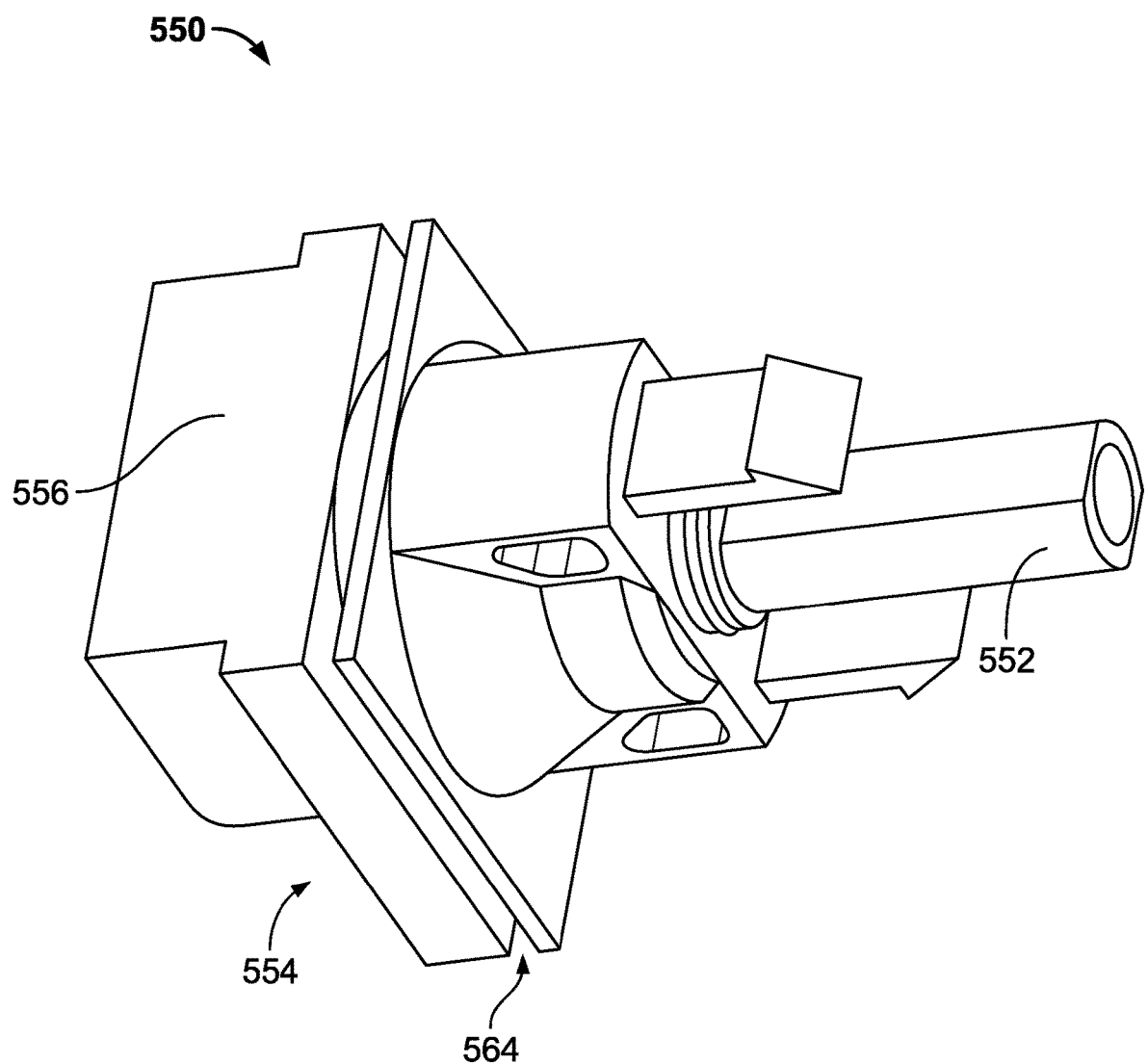
FIG. 35 is an isometric view of a first single DC power connector according to some embodiments of the invention.
Figure 36:
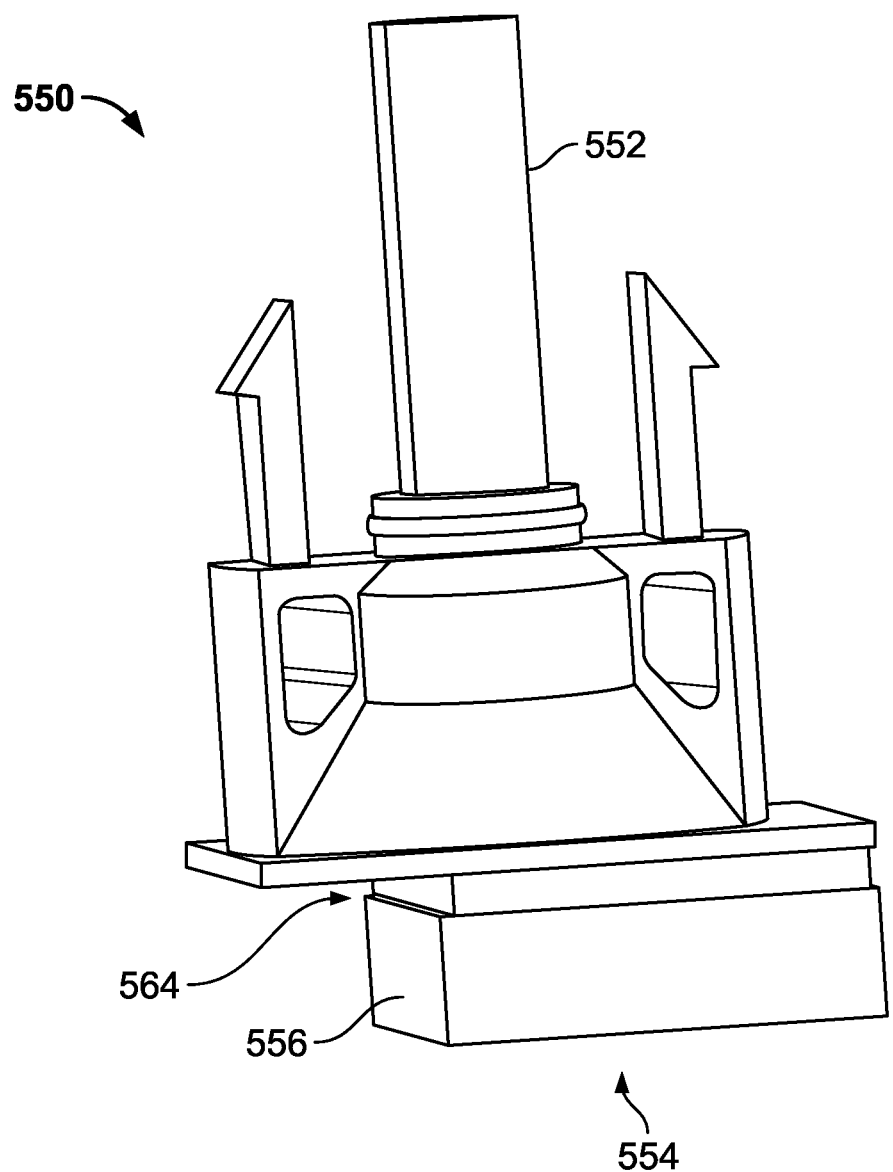
FIG. 36 is an isometric view of the first single DC power connector of FIG. 35.

FIGS. 35-40 illustrate a single DC power connector 550 according to one embodiment of the invention. The single DC power connector 550 may be used with a variety of microinverters, such as with the microinverters 120 and 420 described above. The single DC power connector 550 includes a plug 552 that is similar to the first plug 176 of the DC power connector 126. The single DC power connector 550 also includes a base 554. As illustrated in FIGS. 35 and 36, the base 554 includes a base surface 556. The base surface 556 can engage and support a circuit board 560 (see, for example, FIG. 40). The base 554 also includes a slot 564 that extends into the base 554 perpendicular to the base surface 556.

Figure 37:
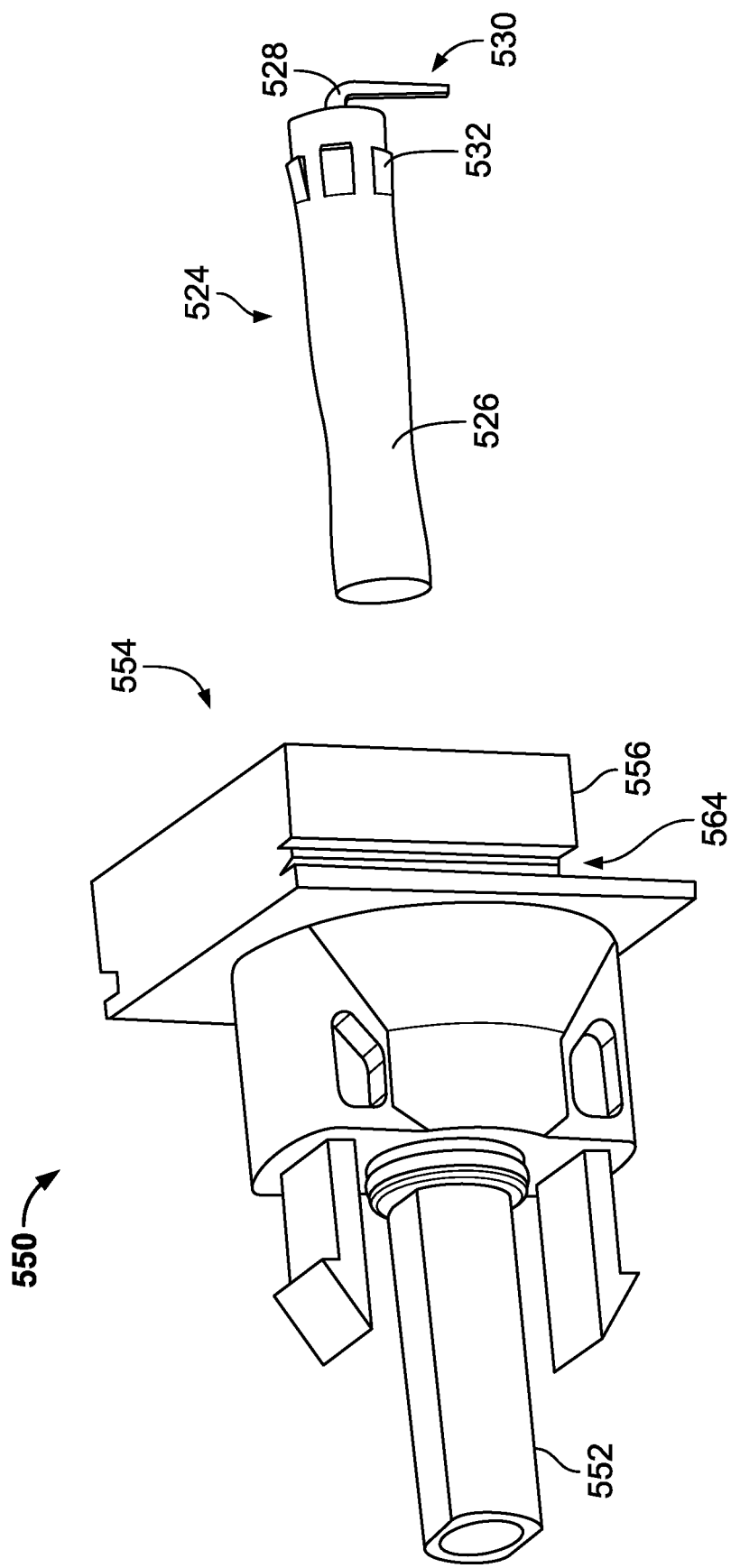
FIG. 37 is an exploded isometric view of the pin of FIG. 33 and the first single DC connector of FIG. 35.

As illustrated in FIG. 37, the single DC power connector 550 is configured to receive a connection pin, such as the connection pin 524, or any other pin described herein or otherwise. The connection pin 524, which may define a male or a female coupling structure, can be inserted into a channel (not shown) that extends through the plug 552. The single DC power connector 550 can correspond to either one of a positive DC power terminal or a negative DC power terminal. In some embodiments, a second DC power connector 570 can correspond to the other of the positive DC power terminal or the negative DC power terminal.

Figure 38:
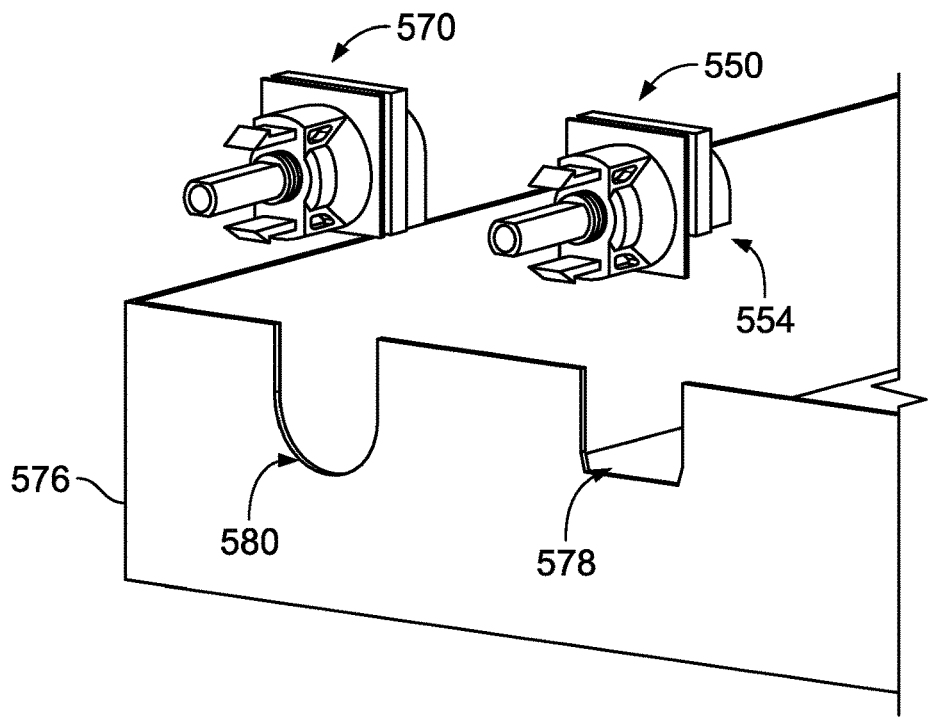
FIG. 38 is an exploded isometric view of the first single DC power connector of FIG. 35, a second single DC power connector, and a housing.
Figure 39:
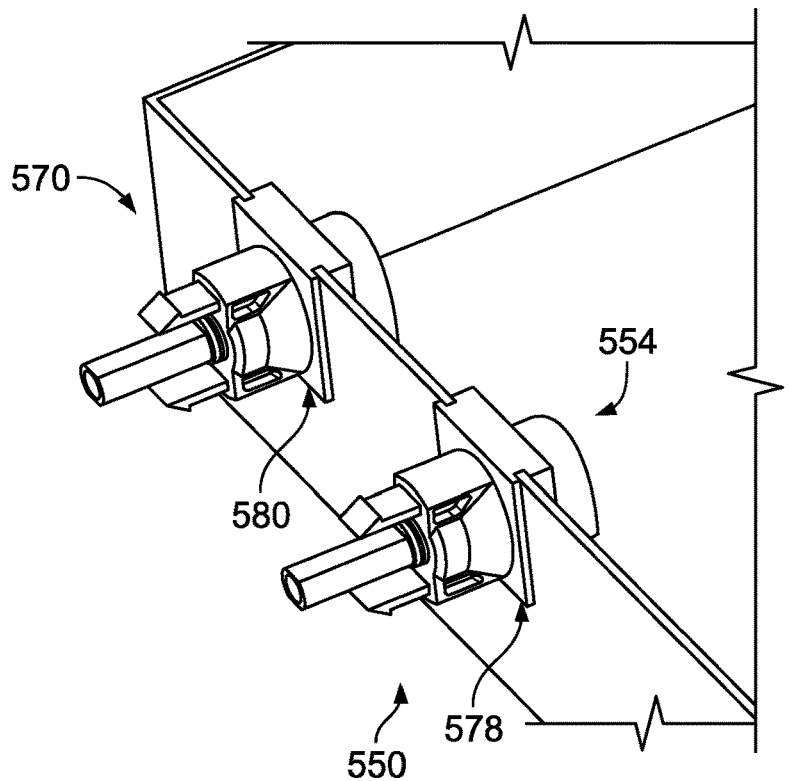
FIG. 39 is an assembled isometric view of the first and second single DC power connectors and the housing of FIG. 38.
Figure 40:
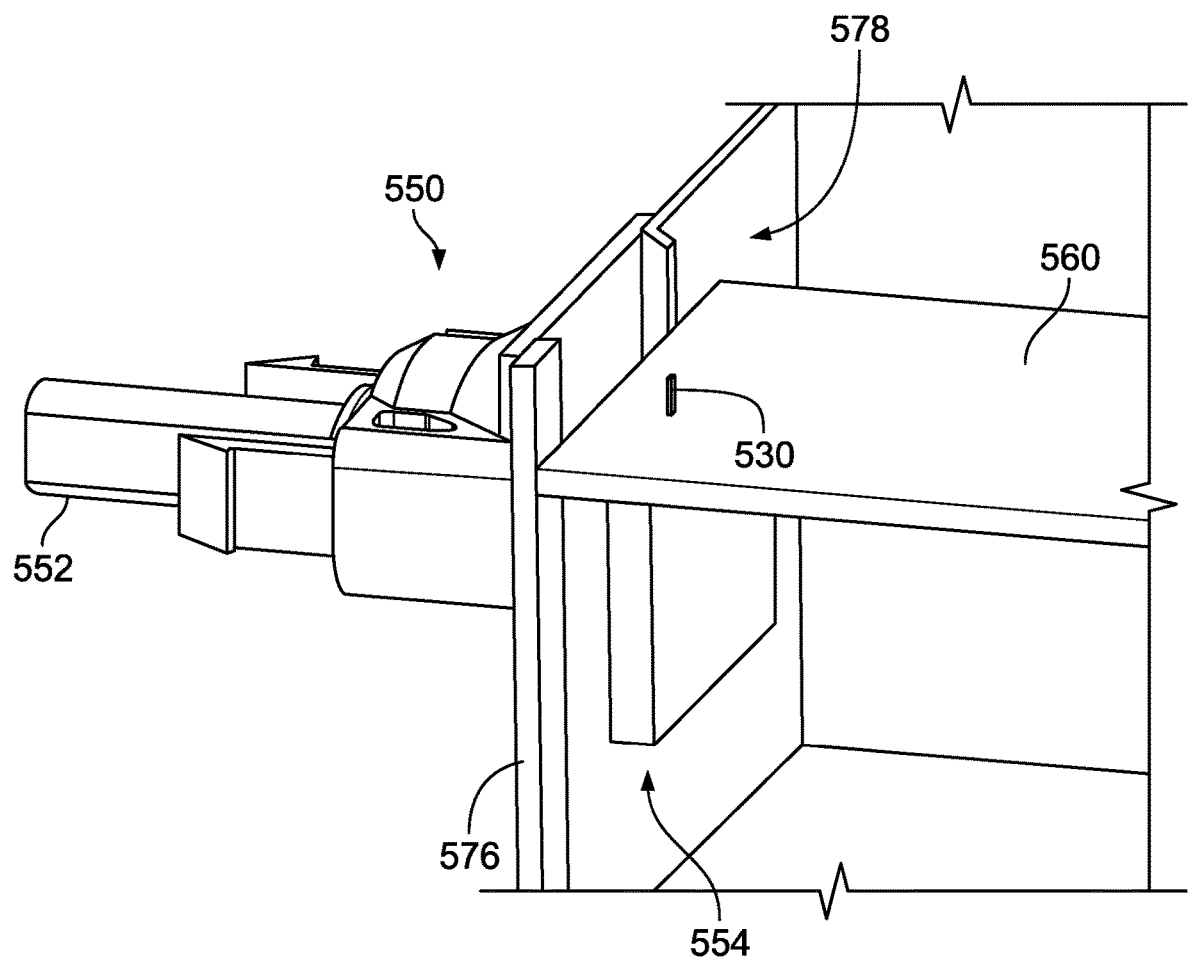
FIG. 40 is an isometric partial side view of the housing and the first single DC power connector of FIG. 39 engaged with a circuit board.

For example, FIG. 38 illustrates the single DC power connector 550 and the second single DC power connector 570 exploded from a housing 576. The housing 576 includes first and second notches 578, 580 that have a profile that corresponds to the bases 554 of each of the single DC power connectors 550, 570. When the single DC power connectors 550, 570 are engaged with the housing 576, the slot 564 can engage the corresponding notch 578, 580 to flank a portion of a wall of the housing 576. Illustrated for example, in FIG. 40, the housing 576 engages the base 554 of the single DC power connector 550 at the slot 564. The engagement of the slot 564 with the notch 578 in the housing 576 positions the base surface 556 at an appropriate height within the housing 576 so that the circuit board 560 is supported by the base surface 556.

In some embodiments, during a manufacturing process, the terminal end 530 of the connection pin 524 may be electrically coupled to the circuit board 560 (e.g., via solder) and the base surface 556 can engage and support a bottom surface of the circuit board 560. Then the assembly of the circuit board and the DC power connector 550 can be inserted into and secured to the housing so that the DC power connector 550 extends outside of the housing 576 via the notch. In other manufacturing processes, one or more pins are aligned with and seated at least partially within a body of a connector. A securing portion of the connector body is engaged with a circuit board to align and support the circuit board relative to the connector and the one or more pins. The one or more pins are electrically coupled to the circuit board (e.g., via a soldering operation). The completed assembly is then aligned and engaged with a receiving structure defined by a housing.

The discussion herein is presented for a person skilled in the art to make and use embodiments of the invention. Given the benefit of this disclosures, various modifications to the illustrated embodiments will be readily apparent to those skilled in the art, and the generic principles herein can be applied to other embodiments and applications without departing from embodiments of the invention. Thus, embodiments of the invention may be not intended to be limited to embodiments shown, but can be to be accorded

The invention claimed is:

1. A method for producing a power conversion device, the method comprising:
providing a printed circuit board that is configured to receive electrical components;
inserting a pin having a connection element into a channel of a power connector;
securing the power connector to the printed circuit board via a securing portion of the power connector;
electrically coupling the connection element to the printed circuit board; and
inserting the printed circuit board into an interior volume of a housing that includes a cutout so that the power connector extends through the cutout,
wherein the pin includes a first alignment feature and the channel includes a second alignment feature, and
wherein inserting the pin into the channel engages the first alignment feature and the second alignment feature.

2. A power conversion device comprising:
a housing that defines an interior volume and includes an exterior surface;
a circuit board secured within the interior volume;
a DC power connector including a DC power connector body and a DC power pin, the DC power connector body engaged with the housing, and the DC power pin extending through a channel of the DC power connector body and through the exterior surface of the housing and into the interior volume whereat the DC power pin is coupled to the circuit board,
the DC power pin including a first alignment feature that engages a second alignment feature of the channel; and
an AC power connector including an AC power connector body and an AC power pin, the AC power connector body engaged with the housing and the AC power pin coupled to the circuit board.

3. The power conversion device of claim 2, further comprising an AC power interface including an interface body dimensioned to selectively engage the AC power connector body and an interface pin configured to electrically engage the AC power pin.

4. The power conversion device of claim 2, wherein the DC power connector body includes a securing portion integrally formed with the DC power connector body, the securing portion including a mate surface to engage a first side of the circuit board.

5. The power conversion device of claim 2, wherein the power conversion device is a combined electronic power converter and inverter system.

6. The method of claim 1, wherein inserting the pin into the channel of the power connector includes rotationally orienting the pin to facilitate electrically coupling the power connector to the circuit board by engaging the first alignment feature and the second alignment feature.

7. The method of claim 1, wherein inserting the pin into the channel to engage the first alignment feature with the second alignment feature includes engaging a tooth with a notch.

8. The method of claim 7, wherein the tooth is integrally formed in the channel of the power connector.

9. The method of claim 1, wherein the power connector is a DC power connect, and the method further comprising securing an AC power connector to the printed circuit board.

10. The method of claim 1, wherein securing the power connector to the printed circuit board includes inserting one or more protrusions that extend from the securing portion of the power connector through the printed circuit board.

11. The method of claim 10, wherein inserting the one or more protrusions through the printed circuit board includes forming a snap fit between the printed circuit board at a lip of the one or more protrusions.

12. The method of claim 1, wherein securing the power connector to the printed circuit board includes engaging a mate surface of the securing portion with a bottom surface of the printed circuit board.

13. The method of claim 1, wherein the power connector sealingly engages the housing at the cutout.

14. The method of claim 1, wherein inserting the printed circuit board into the interior volume of the housing so that the power connector extends through the cutout includes engaging a groove formed in the power connector with the housing at the cutout.

15. The power conversion device of claim 2, wherein the first alignment feature is a notch and the second alignment feature is a tooth.

16. The power conversion device of claim 15, wherein the tooth is integrally formed in the channel of the DC power connector body.

17. The power conversion device of claim 2, wherein the DC power pin includes an annular protrusion that abuts a step formed in the channel of the DC power connector body.

18. The power conversion device of claim 2, wherein the DC power connector body includes a groove dimensioned to receive a protrusion of the housing.

19. The power conversion device of claim 2, wherein the DC power connector body includes a securing portion that extends from a base of the DC power connector body, the securing portion including a mate surface configured to engage a bottom surface of the circuit board.

20. The power conversion device of claim 19, wherein the securing portion includes a protrusion that extends from the mate surface, the protrusion configured to extend through the circuit board.

* * * * *